(12) United States Patent
Hillhouse

(10) Patent No.: US 9,269,968 B2
(45) Date of Patent: Feb. 23, 2016

(54) METHODS AND DEVICES FOR GENERATING ELECTRICITY FROM A FUEL AND AN OXIDANT USING A CAPACITOR

(71) Applicant: University of Washington through its Center for Commercialization, Seattle, WA (US)

(72) Inventor: Hugh Hillhouse, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 214 days.

(21) Appl. No.: 13/758,764

(22) Filed: Feb. 4, 2013

(65) Prior Publication Data

US 2013/0216924 A1 Aug. 22, 2013

Related U.S. Application Data

(60) Provisional application No. 61/594,839, filed on Feb. 3, 2012.

(51) Int. Cl.
  *H01M 8/04* (2006.01)
  *H01M 8/00* (2006.01)
  *H01M 14/00* (2006.01)

(52) U.S. Cl.
  CPC *H01M 8/04* (2013.01); *H01M 8/00* (2013.01); *H01M 8/04089* (2013.01); *H01M 14/00* (2013.01); *Y02E 60/50* (2013.01)

(58) Field of Classification Search
  CPC .......... H01G 4/06; H02J 7/345; H02J 7/0068; H02J 7/007; H01M 10/46; H01M 8/04
  USPC ...................................... 429/408; 361/306.3
  See application file for complete search history.

(56) References Cited

U.S. PATENT DOCUMENTS

| | | | |
|---|---|---|---|
| 6,001,499 | A | 12/1999 | Grot |
| 6,379,828 | B1 | 4/2002 | Worth |
| 2001/0018923 | A1 | 9/2001 | Zuppero |
| 2004/0137317 | A1 | 7/2004 | Sennoun |

(Continued)

FOREIGN PATENT DOCUMENTS

WO 2011/085197 A2 7/2011

OTHER PUBLICATIONS

Savadogo, O., "Emerging Membranes for Electrochemical Systems: Part II. High Temperature Composite Membranes for Polymer Electrolyte Fuel Cell (PEFC) Applications," Journal of Power Sources 127(1-2):135-161, Mar. 2004.

(Continued)

*Primary Examiner* — Cynthia H Kelly
*Assistant Examiner* — Monique Wills
(74) *Attorney, Agent, or Firm* — Christensen O'Connor Johnson Kindness PLLC

(57) ABSTRACT

Devices and methods are provided for generating electrical power using a capacitor. The capacitor has a catalytic working electrode, a dielectric, and a counter electrode. Power is generated by flowing a fuel (e.g., hydrogen gas) over the working electrode, charging the capacitor (e.g. by applying a voltage), flowing an oxidant (e.g., oxygen gas) over the working electrode, and connecting the electrodes to a resistive load, which allows current to flow through the load, between the electrodes. The inverse device (i.e., oxidant first, then fuel) functions similarly.

20 Claims, 29 Drawing Sheets

(56) References Cited

U.S. PATENT DOCUMENTS

| | | |
|---|---|---|
| 2005/0084739 A1 | 4/2005 | Swider-Lyons |
| 2005/0122662 A1* | 6/2005 | Hayashi et al. ............ 361/306.3 |
| 2006/0166055 A1 | 7/2006 | Xie |
| 2011/0070506 A1 | 3/2011 | Friesen |

OTHER PUBLICATIONS

Schmidt, V.M., et al., "Performance Improvement of a PEMFC Using Fuels with CO by Addition of Oxygen-Evolving Compounds," Journal of the Electrochemical Society 144(9):L237-L238, Sep. 1997.
Schoots, K., et al., "Technology Learning for Fuel Cells: An Assessment of Past and Potential Cost Reductions," Energy Policy 38(6):2887-2897, Jun. 2010.
Sepa, D.B., and M.V. Vojnovic, "Kinetics and Mechanism of O(2) Reduction at Pt in Alkaline Solutions," Electrochimica Acta 25(11):1491-1496, Nov. 1980.
Sepa, D.B., and M.V. Vojnovic, "Reaction Intermediates as a Controlling Factor in the Kinetics and Mechanism of Oxygen Reduction at Platinum Electrodes," Electrochimica Acta 26(6):781-793, Jun. 1981.
Serov, A., and C. Kwak, "Review of Non-Platinum Anode Catalysts for DMFC and PEMFC Application," Applied Catalysis B: Environmental 90(3-4):313-320, Aug. 2009.
Shao, Y., et al., "Proton Exchange Membrane Fuel Cell From Low Temperature to High Temperature: Material Challenges," Journal of Power Sources 167(2):235-242, May 2007.
Shao, Y., et al., "Understanding and Approaches for the Durability Issues of Pt-Based Catalysts for PEM Fuel Cell," Journal of Power Sources 171(2):558-566, Sep. 2007.
Song, C., et al., "PEM Fuel Cell Reaction Kinetics in the Temperature Range of 23-120° C," Electrochimica Acta 52(7):2552-2561, Feb. 2007.
Spendelow, J.S., and A. Wieckowski, "Electrocatalysis of Oxygen Reduction and Small Alcohol Oxidation in Alkaline Media," Physical Chemistry Chemical Physics 9(21):2654-2675, 2007.
Steele, B.C.H., "Material Science and Engineering: The Enabling Technology for the Commercialisation of Fuel Cell Systems," Journal of Materials Science 36(5):1053-1068, Mar. 2001.
Steele, B.C.H., and A. Heinzel, "Materials for Fuel-Cell Technologies," Nature 414(6861):345-352, Nov. 2001.
Stevens, D.A., et al., "Ex Situ and In Situ Stability Studies of PEMFC Catalysts: Effect of Carbon Type and Humidification on Degradation of the Carbon," Journal of the Electrochemical Society 152(12):A2309-A2315, Dec. 2005.
Tominaka, S., et al., "On-Chip Direct Methanol Fuel Cells of a Monolithic Design: Consideration of Validity of an Active-Type System," Energy & Environmental Science 2(8):845-848, Aug. 2009.
Tominaka, S., et al., "On-Chip Fuel Cell: Micro Direct Methanol Fuel Cell of an Air-Breathing, Membraneless, and Monolithic Design," Journal of the American Chemical Society 130(32):10456-10457, Aug. 2008.
Vogel, E.M., et al., "Reliability of Ultrathin Silicon Dioxide Under Combined Substrate Hot-Electron and Constant Voltage Tunneling Stress," IEEE Transactions on Electron Devices 47(6):1183-1191, Jun. 2000.
Vogel, W., et al., "Reaction Pathways and Poisons—II: The Rate Controlling Step for Electrochemical Oxidation of Hydrogen on Pt in Acid and Poisoning of the Reaction by CO," Electrochimica Acta 20(1):79-93, Jan. 1975.
Wang, X, et al., "Effect of Voltage on Platinum Dissolution Relevance to Polymer Electrolyte Fuel Cells," Electrochemical and Solid-State Letters 9(5):A225—A227, May 2006.
Wesoff, E., "Bloom Energy vs. Cogeneration Reality," greentechmedia.com, Feb. 10, 2011, <http://www.greentechmedia.com/articles/read/Greenwash-Bloom-Energy-vs.-Cogeneration-Reality> [retrieved Jul. 16, 2013], 4 pages.
Wu, J., et al., "A Review of PEM Fuel Cell Durability: Degradation Mechanisms and Mitigation Strategies," Journal of Power Sources 184(1):104-119, Sep. 2008.
Yang, C., et al., "Approaches and Technical Challenges to High Temperature Operation of Proton Exchange Membrane Fuel Cells," Journal of Power Sources 103(1):1-9, Dec. 2001.
Yousfi-Steiner, N., et al., "A Review of Polymer Electrolyte Membrane Fuel Cell Catalyst Degradation and Starvation Issues: Causes, Consequences and Diagnostic for Mitigation," Journal of Power Sources 194(1):130-145, Oct. 2009.
Yu, P.T., et al., "The Impact of Carbon Stability on PEM Fuel Cell Startup and Shutdown Voltage Degradation," ECS Transactions 3(1):797-809, 2006.
Acres, G.J.K., "The Reaction Between Hydrogen and Oxygen on Platinum: Progress in Establishing Kinetics and Mechanisms," Platinum Metals Review 10(2):60-64, Apr. 1966.
Acton, O., et al., "π-σ-Phosphonic Acid Organic Monolayer-Amorphous Sol-Gel Hafnium Oxide Hybrid Dielectric for Low-Voltage Organic Transistors on Plastic," Journal of Materials Chemistry 19(42):7929-7936, Nov. 2009.
Adžić, R., "Recent Advances in the Kinetics of Oxygen Reduction," in J. Lipkowski and P.N. Ross (eds.), "Frontiers in Electrochemistry," vol. 3, "Electrocatalysis," Wiley-VCH, Weinheim, Germany, 1998, Chap. 5, pp. 197-242.
Adžić, R.R., et al., "Platinum Monolayer Fuel Cell Electrocatalysts," Topics in Catalysis 46(3-4):249-262, Dec. 2007.
Antoine, O., and R. Durand, "RRDE Study of Oxygen Reduction on Pt Nanoparticles Inside Nafion®: H(2)O(2) Production in PEMFC Cathode Conditions," Journal of Applied Electrochemistry 30(7):839-844, Jul. 2000.
Antoine, O., et al., "Oxygen Reduction Reaction Kinetics and Mechanism on Platinum Nanoparticles Inside Nafion®," Journal of Electroanalytical Chemistry 499(1):85-94, Feb. 2001.
Bai, H., and W.W. Ho, "Recent Developments in Fuel-Processing and Proton-Exchange Membranes for Fuel Cells," Polymer International 60(1):26-41, Jan. 2011.
Bar-On, I., et al., "Technical Cost Analysis for PEM Fuel Cells," Journal of Power Sources 109(1):71-75, Jun. 2002.
Borup, R., et al., "Scientific Aspects of Polymer Electrolyte Fuel Cell Durability and Degradation," Chemical Reviews 107(10):3904-3951, Oct. 2007.
Brennan, D., et al., "The Calorimetric Determination of the Heats of Adsorption of Oxygen on Evaporated Metal Films," Proceedings of the Royal Society of London. Series A: Mathematical and Physical Sciences 256(1284):81-105, May 1960.
Büchi, F.N., and S. Srinivasan, "Operating Proton Exchange Membrane Fuel Cells Without External Humidification of the Reactant Gases: Fundamental Aspects," Journal of the Electrochemical Society 144(8):2767-2772, Aug. 1997.
Cheng, X., et al., "A Review of PEM Hydrogen Fuel Cell Contamination: Impacts, Mechanisms, and Mitigation," Journal of Power Sources 165(2):739-756, Mar. 2007.
Choban, E.R., et al., "Microfluidic Fuel Cell Based on Laminar Flow," Journal of Power Sources 128(1):54-60, Mar. 2004.
Conway, B.E., et al., "A Surface-Electrochemical Basis for the Direct Logarithmic Growth Law for Initial Stages of Extension of Anodic Oxide Films Formed at Noble Metals," Journal of Chemical Physics 93(11):8361-8374, Dec. 1990.
Damjanovic, A., and V. Brusic, "Electrode Kinetics of Oxygen Reduction on Oxide-Free Platinum Electrodes," Electrochimica Acta 12(6):615-628, Jun. 1967.
Devanathan, R., "Recent Developments in Proton Exchange Membranes for Fuel Cells," Energy & Environmental Science 1:101-119, Jun. 2008.
Divisek, J., et al., "Components for PEM Fuel Cell Systems Using Hydrogen and CO Containing Fuels," Electrochimica Acta 43(24):3811-3815, Aug. 1998.
Dollard, W.J., "Solid Oxide Fuel Cell Developments at Westinghouse," Journal of Power Sources 37(1-2):133-139, Jan. 1992.
Dyer, C.K., "A Novel Thin-Film Electrochemical Device for Energy Conversion," Nature 343(6258):547-548, Feb. 1990.
Erlebacher, J., "Materials Science of Hydrogen/Oxygen Fuel Cell Catalysis," in H. Ehrenreich and F. Spaepen (eds.), "Solid State Physics," vol. 61, Elsevier USA, 2009, Chap. 2, pp. 77-141.

(56) References Cited

OTHER PUBLICATIONS

Evraud, C., et al., "Piles á Combustibles Utilisant les Propriétés Électrochimiques des Adsorbats" [translation: "A Fuel Cell Using the Electrochemical Properties of Adsorbates"], Weekly Reports of the Meetings of the Academy of Sciences 252(11):1599-1600, Mar. 13, 1961.

Ferreira, P.J., et al., "Instability of Pt/C Electrocatalysts in Proton Exchange Membrane Fuel Cells: A Mechanistic Investigation," Journal of the Electrochemical Society 152(11):A2256-A2271, Nov. 2005.

Ferrigno, R., et al., "Membraneless Vanadium Redox Fuel Cell Using Laminar Flow," Journal of the American Chemical Society 124(44):12930-12931, Nov. 2002.

Freitas, K.S., et al., "Electrocatalysis of the Hydrogen Oxidation in the Presence of CO on Rh(O)2/C-Supported Pt Nanoparticles," Electrochimica Acta 56(1):418-426, Dec. 2010.

Gewirth, A.A., and M.S. Thorum, "Electroreduction of Dioxygen for Fuel-Cell Applications: Materials and Challenges," Inorganic Chemistry 49(8):3557-3566, Apr. 2010.

Gottesfeld, S., "Electrocatalysis of Oxygen Reduction in Polymer Electrolyte Fuel Cells: A Brief History and a Critical Examination of Present Theory and Diagnostics," in M.T.M. Koper (ed.), "Fuel Cell Catalysis: A Surface Science Approach," Wiley & Sons, 2009, Chap. 1, pp. 1-30.

Gottesfeld, S., "Thin-Film Fuel Cells," Nature 345(6277):673, Jun. 1990.

Gottesfeld, S., and J. Pafford, "A New Approach to the Problem of Carbon Monoxide Poisoning in Fuel Cells Operating at Low Temperatures," Journal of the Electrochemical Society 135(10):2651-2652, Oct. 1988.

Grimes, P.G., et al., "Session on Primary Fuel Cell Batteries: Liquid Alkaline Fuel Cells," Proceedings: 15th Annual Power Sources Conference, May 9-11,1961, PSC Publications Committee, Red Bank, N.J., pp. 29-32.

Hibino, T., et al., "A Low-Operating Temperature Solid Oxide Fuel Cell in Hydrocarbon-Air Mixtures," Science 288 (5473):2031-2033, Jun. 2000.

Hickner, M.A., et al., "Alternative Polymer Systems for Proton Exchange Membranes (PEMs)," Chemical Reviews 104(10):4587-4612, Oct. 2004.

Ji, M., and Z. Wei, "A Review of Water Management in Polymer Electrolyte Membrane Fuel Cells," Energies 2(4):1057-1106, Nov. 2009.

Kanellos, M., "Making Fuel Cells From Car Parts," greentechmedia.com, Jan. 21, 2010, <http://www.greentechmedia.com/articles/read/making-fuel-cells-from-car-parts> [retrieved Jul. 16, 2013], 3 pages.

Kang, L., et al., "Electrical Characteristics of Highly Reliable Ultrathin Hafnium Oxide Gate Dielectric," IEEE Electron Device Letters 21(4):181-183, Apr. 2000.

Klein, N., and H. Gafni, "The Maximum Dielectric Strength of Thin Silicon Oxide Films," IEEE Transactions on Electron Devices 13(2):281-289, Feb. 1966.

Kreuer, K.D., "On the Development of Proton Conducting Polymer Membranes for Hydrogen and Methanol Fuel Cells," Journal of Membrane Science 185(1):29-39, Apr. 2001.

Kuhn, M., and T.W. Napporn, "Single-Chamber Solid Oxide Fuel Cell Technology—From Its Origins to Today's State of the Art," Energies 3(1):57-134, Jan. 2010.

Larminie, J., and A. Dicks, "Fuel Cell Systems Explained," 2d ed., Wiley & Sons, Hoboken, N.J.,2003, pp. 1-24, Chap. 1, p. 15, Table 1.1, and Chap. 1, p. 23, Figure 1.21.

Li., Q., et al., "The CO Poisoning Effect in PEMFCs Operational at Temperatures up to 200° C," Journal of the Electrochemical Society 150(12):A1599-A1605, Dec. 2003.

Li, X. et al., "Highly Stable Pt and PtPd Hybrid Catalysts Supported on a Nitrogen-Modified Carbon Composite for Fuel Cell Application," Journal of Power Sources 195(2):445-452, Jan. 2010.

Mallouk, T.E., "Miniaturized Electrochemistry," Nature 343(6258):515-516, Feb. 1990.

Mauritz, K.A., and R.B. Moore, "State of Understanding of Nafion," Chemical Reviews 104(10):4535-4586, Oct. 2004.

Motokawa, S., et al., "A Micro Direct Methanol Fuel Cell Using Platinum and Platinum-Ruthenium Electroplated Microchannel Electrodes," Electrochemistry 73(5):346-351, May 2005.

Nørskov, J.K., et al., "Origin of the Overpotential for Oxygen Reduction at a Fuel-Cell Cathode," Journal of Physical Chemistry B 108(46)17886-17892, Nov. 2004.

O'Hayre, R., et al., "Fuel Cell Fundamentals," 2d ed., Wiley & Sons, Hoboken, N.J., Jan. 2009, Chap. 8, "Overview of Fuel Cell Types," pp. 282-286.

Orazem, M.E., and B. Tribollet, "Electrochemical Impedance Spectroscopy," Wiley & Sons, Hoboken, N.J., Sep. 2008, p. xxviii.

Oszcipok, M., et al., "Low Temperature Operation and Influence Parameters on the Cold Start Ability of Portable PEMFCs," Journal of Power Sources 154(2):404-411, Mar. 21,2006.

Ragauskas, A.J., et al., "The Path Forward for Biofuels and Biomaterials," Science 311(5760):484-489, Jan. 2006.

Rosenblum, L., and R.E. English, "Nuclear-Electric Systems in Space," Technical Report, National Aeronautics and Space Administration, Jan. 1, 1958, pp. 243-254.

Satyapal, S., "Overview of DOE Hydrogen and Fuel Cell Activities," International Hydrogen Fuel-Cell Technology and Vehicle Development Forum (IPE Workshop Report), Shanghai, China, Sep. 21-22, 2010, 22 pages.

International Search Report and Written Opinion, issued in corresponding International Application No. PCT/US2013/024659, filed Feb. 4, 2013, 13 pages.

Extended European Search Report dated Jun. 16, 2015, issued in corresponding European Application No. 13 743 555.8, filed Feb. 4, 2013, 7 pages.

* cited by examiner

METHODS AND DEVICES FOR GENERATING ELECTRICITY FROM A FUEL AND AN OXIDANT USING A CAPACITOR

CROSS-REFERENCE TO RELATED APPLICATION

This application claims the benefit of U.S. Patent Application No. 61/594,839, filed Feb. 3, 2012, the disclosure of which is hereby incorporated by reference in its entirety.

BACKGROUND

Fuel cells (FCs) are versatile energy conversion technology. They can convert numerous high energy density fuels directly into electricity without first converting the chemical energy into thermal energy, bypassing the Carnot efficiency limitations of conventional heat engines. All conventional fuel cells consist of an anode where a fuel is oxidized and a cathode where an oxidant (typically oxygen) is reduced. The anode and cathode are separated by an ion transport membrane and connected via an external electrical circuit, as illustrated in FIG. 1A. FIG. 1B illustrates the equivalent circuit diagram used to represent the physical processes and test the FC with an applied voltage or source-measure unit. The free energy of reaction drives a DC current flow through a load in the external circuit while ions (typically $H^+$, $OH^-$, $CO_3^{2-}$, or $O^{2-}$) flow through the membrane. In addition to their potential for high efficiency, fuel cells may be operated with clean fuels such as hydrogen (yielding water as the only exhaust) or sustainable biofuels that are carbon neutral (produce no net $CO_2$). Fuel cells come in many different varieties with a wide range of potential applications. High temperature fuel cells (solid oxide fuel cells, SOFCs) have typically been considered for stationary power, and low temperature fuel cells (proton exchange membrane fuel cells, or PEMFCs) have typically been considered for transportation or portable power. FCs yield high power density (especially when compared to technologies like solar energy). But still, market penetration for both PEMFCs and SOFCs is low due to high cost and reliability issues. The typical power density for a commercial PEMFC is around 600 mW/cm$^2$, while that for an SOFC is around 300 mW/cm$^2$. In 2009 the U.S. Department of Energy set fuel cell cost and lifetime goals to be $750/kW with 40,000 hours of operation for stationary power and $30/kW with 5,000 hours of operation for the transportation sector.

SOFC technology appears to be mature enough and poised for commercial success, particularly for stationary power applications where the valuable heat may be utilized and the net efficiency increased. The increased market penetration that now seems possible for SOFCs is actually a positive development for other fuel cells technologies as well. Some technologies have intrinsic advantages for applications such as transportation or portable power, but further development is hindered by the perception that FCs are problematic. The quick response time and low operating temperature are key for automotive and portable power applications. For these applications particular focus has been paid to PEMFCs. However there are many barriers to PEMFC development and commercialization. Scientific challenges still exist to improve the oxygen reduction reaction (ORR) catalyst, prevent poisoning of the hydrogen oxidation reaction (HOR) catalyst, and develop higher temperature proton conducting membranes. In addition there are more practical issues which need to be addressed like active water management to maintain membrane wetness without flooding, improving device reliability, and lowering system cost. Also, it could be viewed either as a liability or a great benefit, but the most advanced PEMFCs use hydrogen as the fuel. Below, we review some of the issues with conventional PEMFCs and review some novel fuel cell design concepts which seek to bypass the limitations of conventional devices, such as single-chamber and membraneless designs.

Conventional Proton-Exchange Membrane Fuel Cells (PEMFCs)

The oxidation of hydrogen to yield water is given by the following familiar reaction:

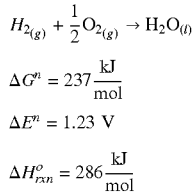

$$H_{2(g)} + \frac{1}{2}O_{2(g)} \rightarrow H_2O_{(l)}$$

$$\Delta G^n = 237 \frac{kJ}{mol}$$

$$\Delta E^n = 1.23 \text{ V}$$

$$\Delta H^o_{rxn} = 286 \frac{kJ}{mol}$$

This simple and clean reaction has tremendous appeal for using hydrogen as an energy carrier, especially when combined with renewable (solar or wind generated) hydrogen. The fly in the ointment that tempers one's enthusiasm for the fuel though is the difficulty with storing and distributing hydrogen. In addition, the low temperature fuel cell technology that converts it to electricity (the PEMFC) has several problems that have prevented its cost effectiveness and thus its widespread adoption. A summary of some of the most significant problems are presented below.

Catalysts for the Oxygen Reduction Reaction: High Activation Overpotential

The oxidation reduction reaction (ORR) is puzzling in that it is one of the oldest known electrochemical reactions, and yet it remains one of the most poorly understood. Numerous mechanisms have been proposed for the ORR on platinum, and the most widely accepted mechanism is the associative adsorption mechanism:

 (rxn1)

 (rxn2)

 (rxn3)

 (rxn4)

 (rxn5)

The rate determining step is thought to be reaction rxn2 above, but the debate over mechanism and rate limiting step remains open. Increasing its reaction rate can dramatically improve fuel cell performance. Research on the ORR has focused mainly on the development of new catalysts. While the overall rate can also be increased by simply increasing the temperature beyond the 80° C. where PEMFCs are typically operated, this causes other issues, particularly with the ion transport membrane as discussed below.

Catalysts for the Hydrogen Oxidation Reaction: Poisoning

Carbon monoxide, sulfur, and other species can poison the HOR catalyst, typically platinum. This phenomenon is well known and has been recently reviewed. Since CO is a by-product of the reforming process through which most hydrogen is produced (FIG. 2), it is a serious impediment to the development of PEMFC technology. CO poisons a platinum catalyst by strongly chemisorbing to the surface and blocking the active reaction site. The easiest way to overcome the problem of CO poisoning is to increase the operating temperature. The tolerance of CO is directly related to temperature. Increasing the temperature to as little as 130° C. dramatically improves PEMFC performance in the presence of CO. However, as the temperature is increased, the PEM dries out and the series resistance increases leading to lower efficiency. The conventional approach is to develop an alternative to the Nafion polymer used in current technology or develop catalysts that are more tolerant to the presence of CO. However, other interesting ideas have been proposed. For instance, it has been proposed to inject oxygen or hydrogen peroxide into the fuel stream to oxidize CO before it reaches the catalyst. However, the poisoning issue is pernicious and unresolved.

Both ORR and HOR Catalysts: Degradation

Another problem with conventional PEMFC catalysts is degradation. Platinum particle dissolution and agglomeration and carbon support reaction are the main mechanisms of degradation, and both are facilitated by the presence of water. If the carbon support and liquid water were eliminated, many of the degradation concerns would be alleviated.

Membrane Humidification: Kinetics Better at Higher Temperature, but the Membrane Dries Out PEMFC technology has as one of its primary advantages that it operates at a low temperature. However by increasing the temperature, fuel cell performance can be greatly improved. This is primarily due to the improvement in exchange current density, but performance improvements are also observed in efficiency due to better heat and water management. However the membrane in typical PEMFCs needs to be humidified for facile ion transport. This is because the proton conductivity of Nafion, the standard PEMFC membrane material, drops as the membrane dries causing an increase in ohmic losses and ultimately leads to device failure. To get around this problem it is necessary to have an external humidifier to run PEMFCs at higher temperatures. Also, because they have a hydrated membrane, PEMFCs can also suffer catastrophic failure in sub-freezing environmental conditions. Getting around these limits requires the development of new membrane materials, which is a highly active field of study. However at present no alternative membrane technologies have both high performance and robust operation at high temperature. This issue with proton exchange membranes has prompted the development of several unconventional fuel cell designs.

Unconventional Fuel Cell Designs

In order to circumvent many of the issues discussed above, entirely new device architectures have been proposed. These include so called "single-chamber" designs and "membraneless" designs. A summary of a few of these devices is provided below.

Single-chamber fuel cell concepts (FIGS. 3A and 3B) were considered as early as the late 1950s. But in 1990, a single-chamber design generated both interest and controversy. The device functions similar to a conventional PEMFC with the major exception that the hydrogen and oxygen are mixed and fed to the same side of the device. The mechanism of operation has been debated, but the devices were able to achieve about 1 volt and power densities of 1 to 5 mW/cm². The design has the advantage that it does not need seals and could be fabricated in a simple manner. However, since hydrogen is also present at the outer electrode, there is a substantial chemical (not electrochemical) reaction rate between hydrogen and oxygen, which represents a significant loss in efficiency. Interestingly, it was noted that high humidification and low pressures reduced this undesirable side reaction. Others later developed a two sided design with selective catalysts (FIG. 3B) that operates more similar to an SOFC. This latter device also generated significant interest and spawned several research efforts.

Another unconventional design uses mass transport limitations to keep fuel away from the cathode and the oxidant away from the anode. These "membraneless" designs do not have a membrane, but they still require the DC transport of an ion—typically diffusion across a laminar flow field in a microfluidic channel. The fuel and oxidant streams are merged at a y-junction (FIG. 4) at low Reynolds number (Re<10). As the fluid flows down the channel, the fuel and oxidant species begin to diffuse across the channel creating a diffusion zone which acts quite similar to a membrane in a conventional fuel cell. One advantage of this design is its simplicity and compact size, but they yield very low power densities, have very poor fuel efficiency, and require continuous liquid flow (and perhaps recycling).

In short, both of these unconventional fuel cell designs have some unique traits, but neither addresses the key issues with low temperature fuel cell technology without creating more serious problems (such as low faradic efficiency). The high cost of platinum and Nafion, the low temperature HOR poisoning, ORR and HOR catalyst degradation, the presence of liquid water, and the difficulty of actively managing water all combine to provide significant technical and reliability barriers that inhibit PEMFC technology.

A solution that avoids these issues would be a breakthrough that would significantly alter and enhance the prospects for low-temperature fuel cell technology.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method of generating electricity from a fuel and an oxidant is provided. In one embodiment, the method includes the steps of:

(a) immobilizing the fuel on a working electrode of the capacitor by:

exposing the working electrode to the fuel, wherein the working electrode comprises a catalyst for an electrochemical reaction between the fuel and the oxidant; and charging the capacitor by biasing the working electrode such that it becomes positively charged and biasing a counter electrode of the capacitor such that it becomes negatively charged, wherein a dielectric of the capacitor separates the counter electrode from the working electrode, and wherein charging the capacitor is performed either before or after exposing the working electrode to the fuel;

(b) exposing the working electrode to the oxidant after the fuel has been immobilized on the working electrode; and (c) generating electrical power by connecting an electrical load between the working electrode and the counter electrode.

In another aspect, another method of generating electricity from a fuel and an oxidant is provided. In one embodiment, the method includes the steps of:

(a) immobilizing the oxidant on a working electrode of the capacitor by:

exposing the working electrode to the oxidant, wherein the working electrode comprises a catalyst for an electrochemical reaction between the fuel and the oxidant; and charging the capacitor by biasing the working electrode such that it becomes negatively charged and biasing a counter electrode of the capacitor such that it becomes positively charged, wherein a dielectric of the capacitor separates the counter electrode from the working electrode, and wherein charging the capacitor is performed either before or after exposing the working electrode to the fuel;

(b) exposing the working electrode to the fuel after the oxidant has been immobilized on the working electrode; and (c) generating electrical power by connecting an electrical load between the working electrode and the counter electrode.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A: Single-side gas exposure with non-selective electrodes. FIG. 3B: Two-sided gas exposure with selective electrodes.

FIG. 13A is a perspective view and FIG. 13B is a top plan view.

FIG. 19B is a detail of the MIM-mounted cylinder of FIG. 19A.

DETAILED DESCRIPTION

Figure 1A:
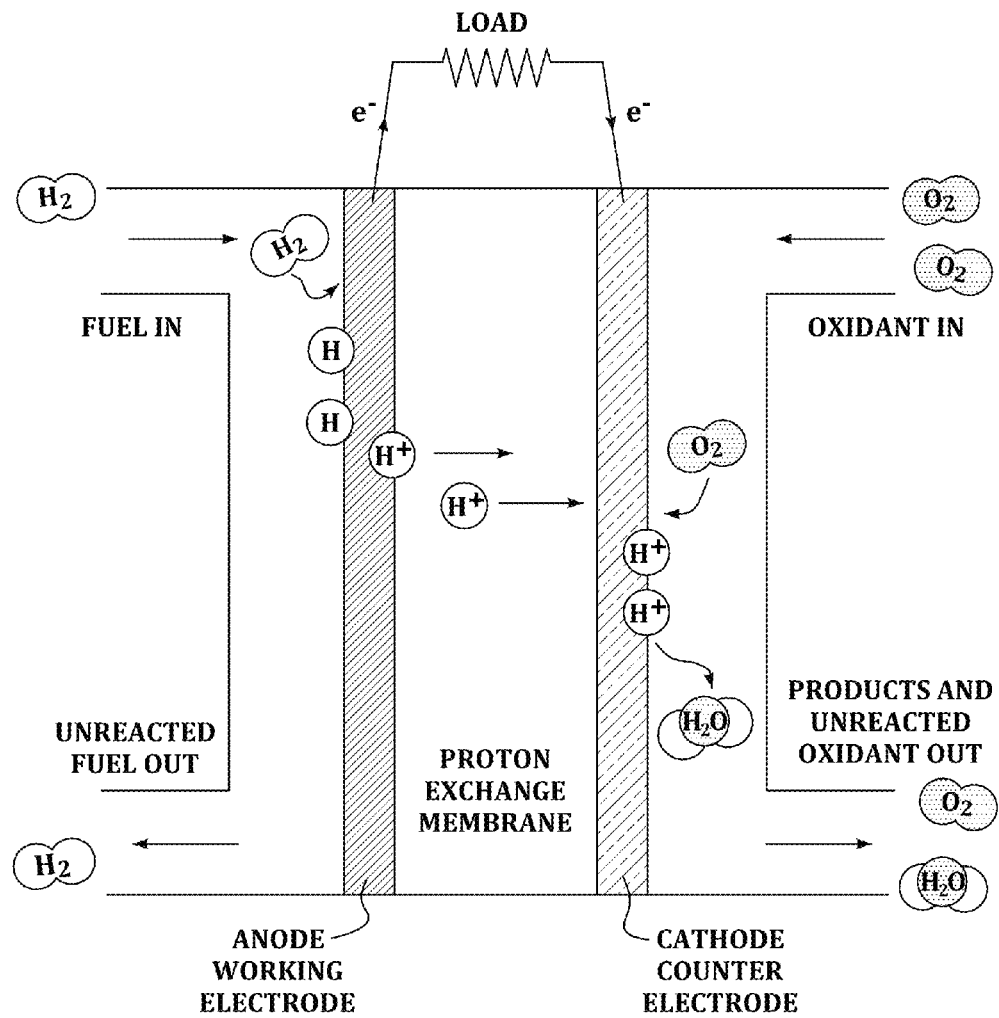
FIG. 1A is a schematic of a PEMFC and FIG. 1B is its equivalent circuit diagram used to represent the physical processes and test the FC with an applied voltage or source-measure unit. The capacitors here are due to the non-faradic electrochemical double layer charging while $R_a$ and $R_c$ are faradic charge transfer resistances due to the ORR and HOR. $R_m$ is then the series resistance due to proton transport through the membrane.
Figure 1B:
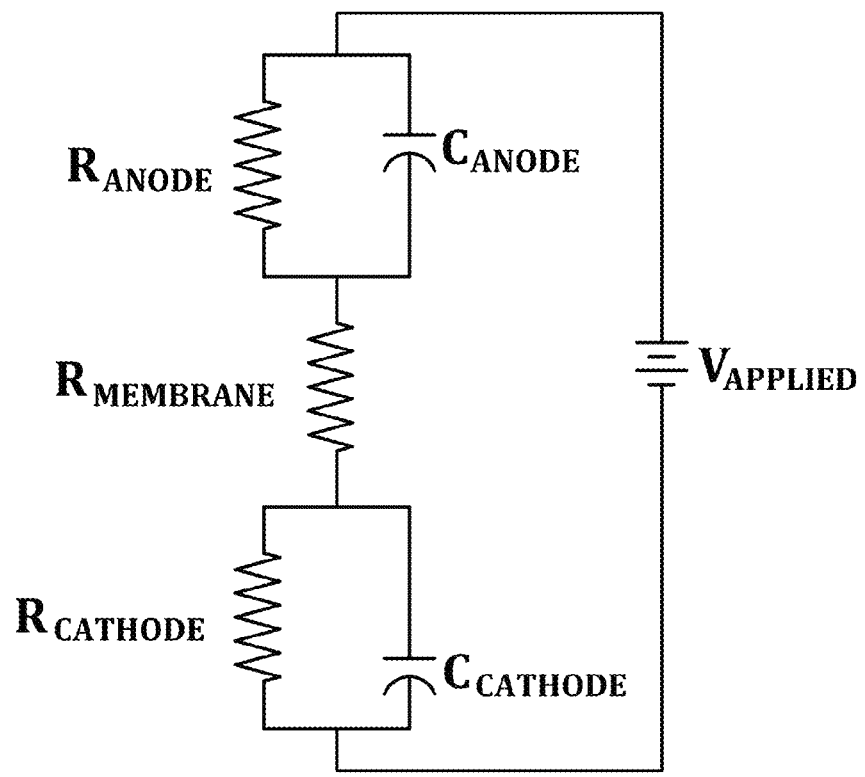
Figure 2:
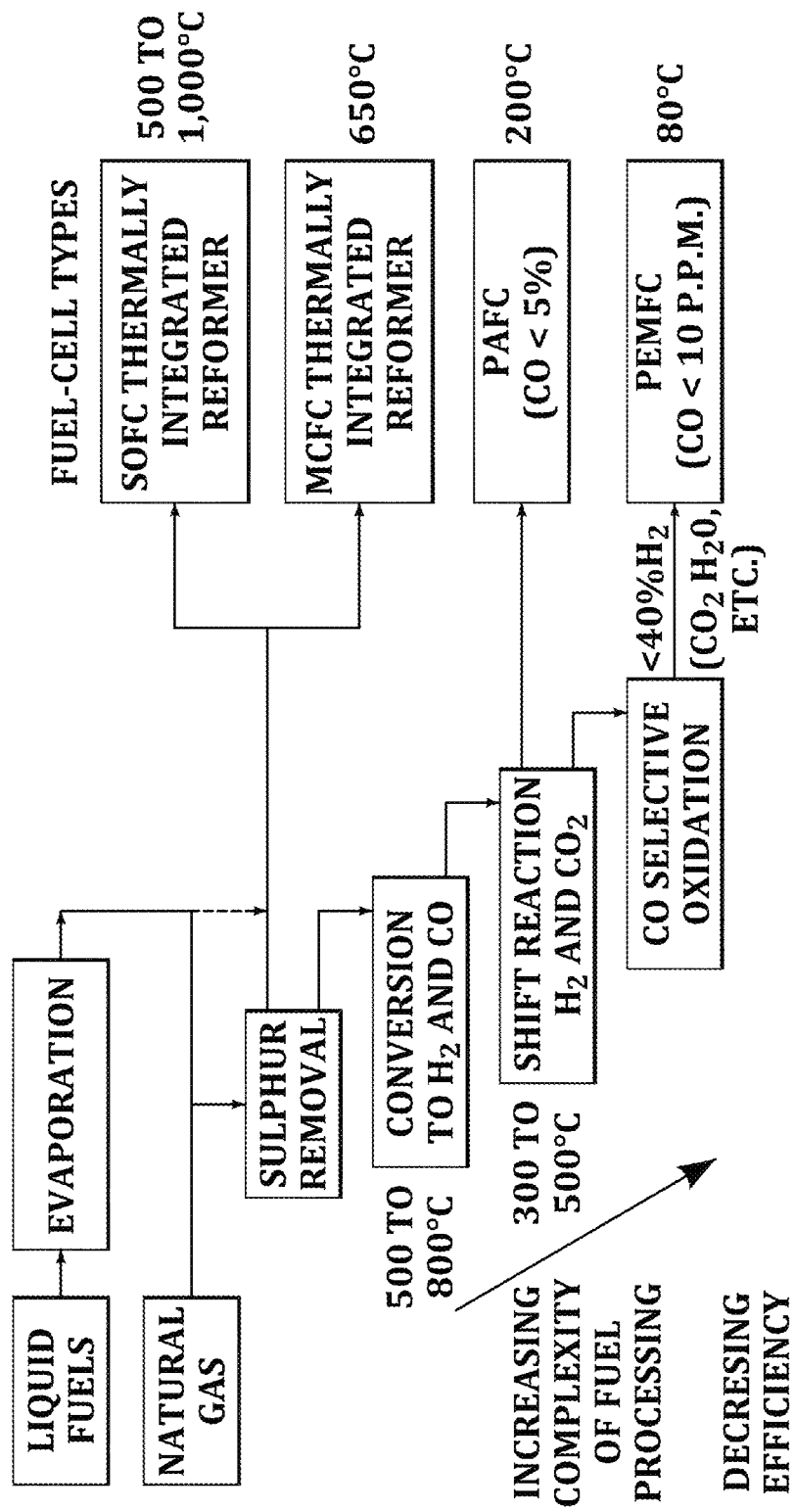
FIG. 2. Fuel reforming for various FC types.
Figure 3A:
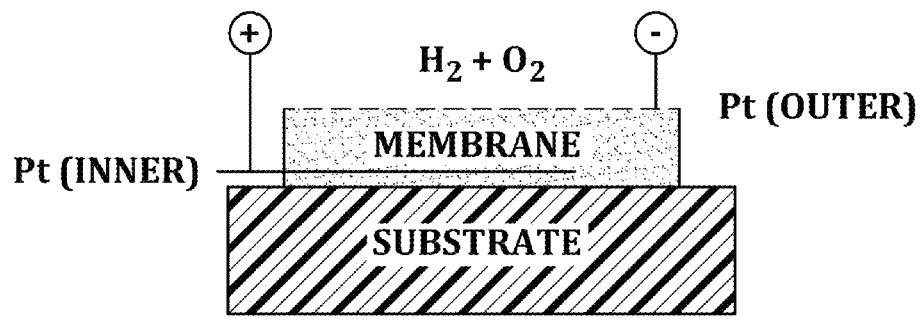
FIGS. 3A and 3B. Single-chamber mixed-gas fuel cell designs.
Figure 3B:
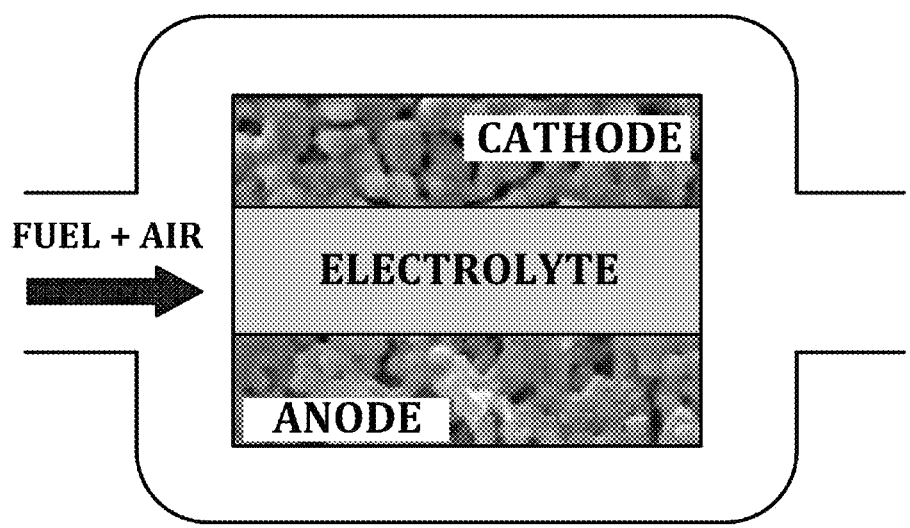
Figure 4:
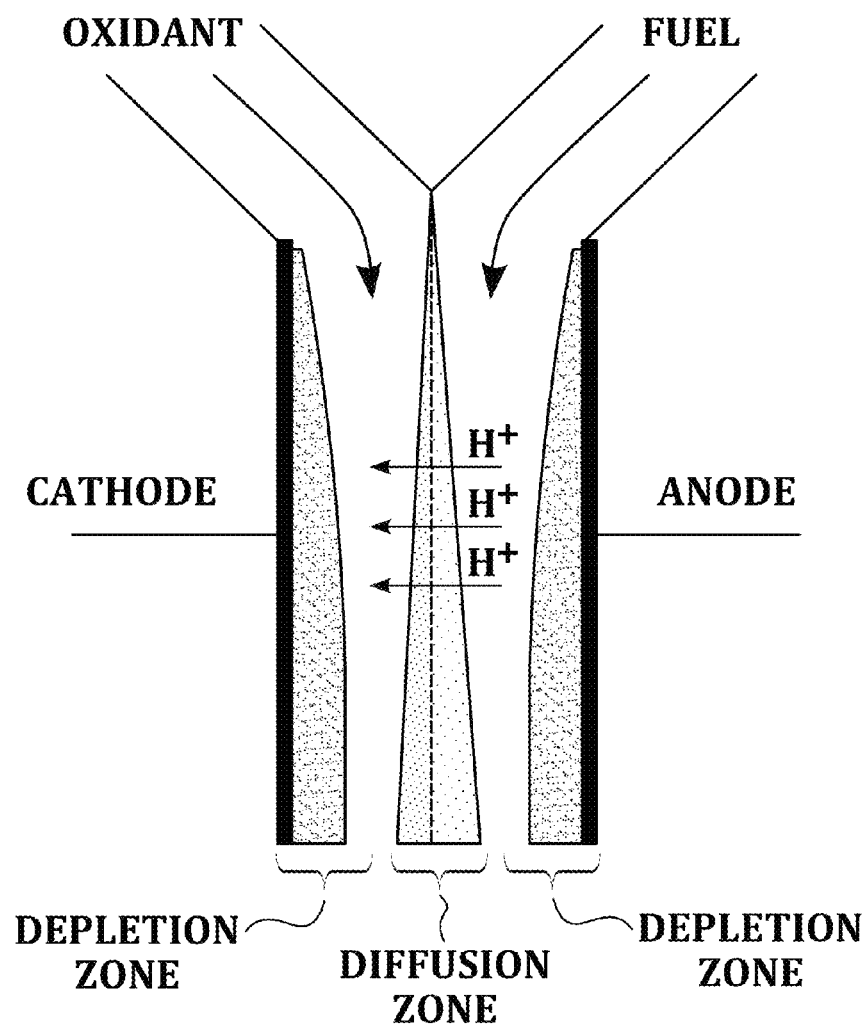
FIG. 4. Design of a membraneless laminar flow fuel cell.

Disclosed herein is a novel membraneless fuel cell (also referred to as a "capacitor" herein) design that can be used to directly generate alternating current (AC) power or pulsed DC power. The capacitor requires no ion transport, no liquid water, no carbon, and has no restrictions on operating temperature.

In one aspect, a method of generating electricity from a fuel and an oxidant is provided. In one embodiment, the method includes the steps of:

(a) immobilizing the fuel on a working electrode of the capacitor by:
exposing the working electrode to the fuel, wherein the working electrode comprises a catalyst for an electrochemical reaction between the fuel and the oxidant; and
charging the capacitor by biasing the working electrode such that it becomes positively charged and biasing a counter electrode of the capacitor such that it becomes negatively charged, wherein a dielectric of the capacitor separates the counter electrode from the working electrode, and wherein charging the capacitor is performed either before or after exposing the working electrode to the fuel;

(b) exposing the working electrode to the oxidant after the fuel has been immobilized on the working electrode; and (c) generating electrical power by connecting an electrical load between the working electrode and the counter electrode.

A traditional fuel cell has two electrodes: a dedicated cathode and a dedicated anode. It produces DC electricity when electrons move through an external circuit while a steady flow of protons move through the internal membrane that separates the two electrodes. Contrary to this scheme, in the disclosed embodiments, the same physical electrode surface alternates between being the site of the cathodic reaction and the anodic reaction, and thus the proton stays on the electrode while the electrode is exposed to different gas phase environments. The gas may be changed by either flowing in a different gas, translating the electrode into a different environment, or rotating the electrode into a different environment. With the addition of a dielectric layer under the catalyst (to help the electrode support more surface charge density) and a switching circuit, the device produces pulsed DC or AC current with net electrical power output.

The disclosed device consists of a planar metal-insulator-metal (MIM) ("capacitor") architecture. The top metal electrode (the working electrode, WE) is chosen to be catalytically active for both the HOR and the ORR, and the bottom metal electrode (the counter electrode, CE) is chosen only for its conductivity, adhesion, and convenience. For an exemplary device, platinum is used for the WE and aluminum or gold for the CE. The choice of the dielectric layer is important and will be discussed below in greater detail. The device operates in a cyclic fashion with the four steps shown in FIG. 5A. After the ORR in the final step, the cycle could be repeated to create pulsed DC power, or two devices can be combined to yield AC power.

Figure 5A:
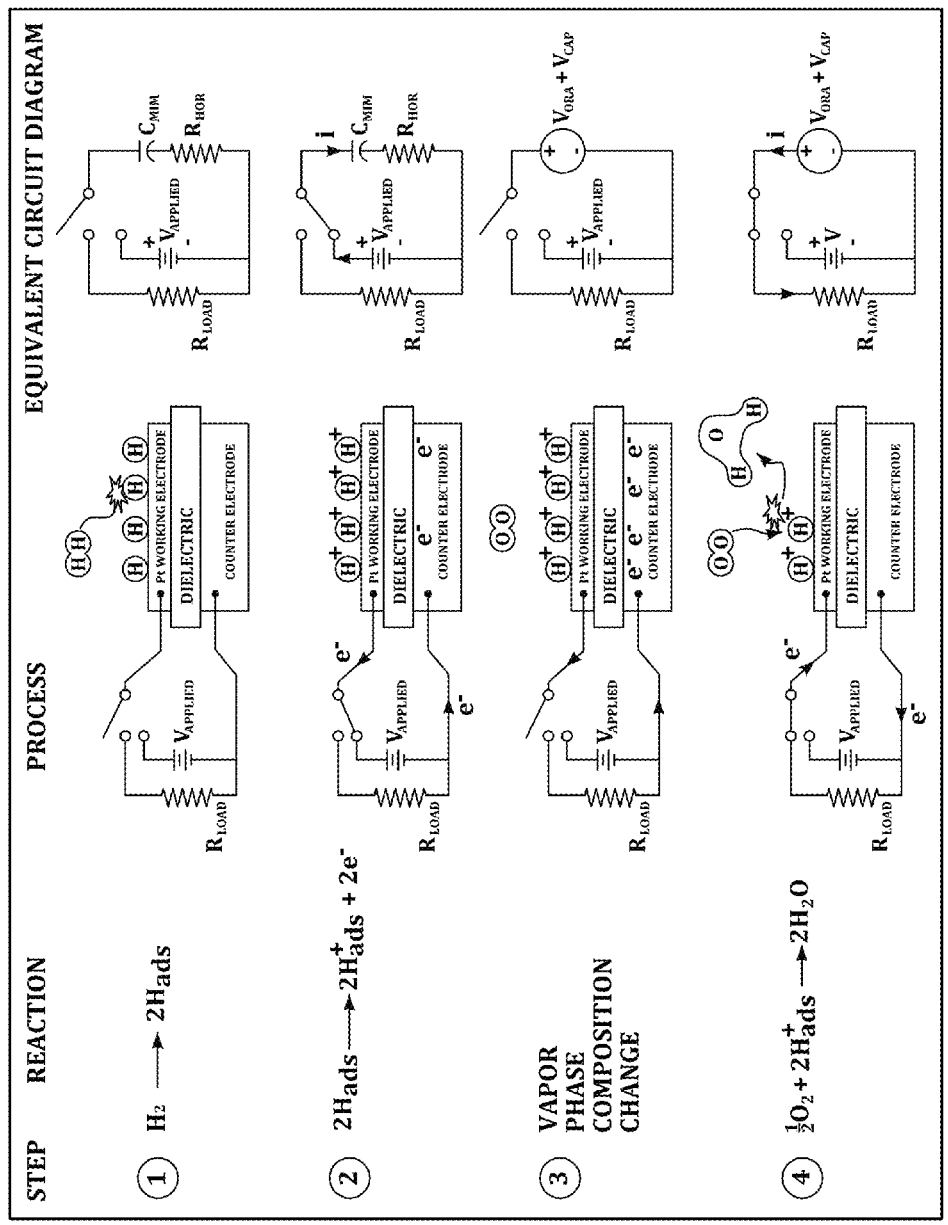
FIG. 5A. Principle steps of operation for a metal-insulator-metal (MIM) fuel cell: (1) Adsorption—Diluted $H_2$ in $N_2$ flows into the reaction chamber, adsorbs, and dissociates while the device is held at open circuit conditions. (2) HOR/Charging—The circuit is completed and a voltage is applied across the metal-insulator-metal (MIM) device from an external power supply. The adsorbed hydrogen atoms are oxidized. The energy paid by the power supply is stored in the electric field at the surface surrounding the adsorbed $H^+$ and in the polarized dielectric. $C_{MIM}$ is the capacitance of the device and $R_{HOR}$ is the charge transfer resistance. (3) Change Vapor Phase—The circuit is opened and the hydrogen gas is purged from the chamber with an inert while a voltage exists across the device. Air or oxygen is then flowed into the chamber. The voltage across the device will then rise by $V_{ORR}$ as oxygen interacts with the $H_{ads}^+$, adding an additional driving force for electrons flow back to the working electrode. (4) ORR/Discharging—The electrical circuit is then completed providing a path for the electrons to flow through the load. $O_2$ and $2H_{ads}^+$ combine with $2e^-$. For an ideal system (no ohmic loss, no leakage through the dielectric, and no parasitic reactions) the energy output of the device would be equal to the energy of the reaction of surface protons and oxygen to form water, minus the energy to strip the electrons.

Note that for the exemplary device illustrated in FIG. 5A, the HOR requires power to be input into the device. The goal is for the electrical power output during the ORR to be more than the power input during the HOR. The expected voltage, current, and power versus time for one complete cycle shown in FIG. 5A is plotted in FIG. 6. The exemplary device illustrated in FIG. 5B requires no external power to be input (i.e., no bias) into the device. Instead, the device is charged through the interaction of the fuel with the working electrode, which sufficiently polarizes the device (e.g., through adjusting the Fermi level of the WE) so as to provide a charged state that facilitates the remaining steps of the process.

During Step 1, $H_2$ (fuel) flows into reaction chamber and adsorbs on the Pt surface where it dissociates spontaneously. The quantity adsorbed will be determined by the platinum loading, dispersion, partial pressure of $H_2$, the presence of any competitive adsorbates, and the condition of the catalyst surface. During this step, no significant current flows and there is virtually no change in the voltage across the device.

During Step 2, a voltage is applied, the HOR proceeds creating $H_{ads}^+$, electrons flow out of the WE (current flows into the WE), and the device charges. The current dies off exponentially since it is simply the charging of a simple RC series circuit, and the voltage plateaus to the value of the applied voltage. The power input is just the current times the voltage.

It will be appreciated that the ordering of Steps 1 and 2 can be reversed, in that the capacitor can be charged before exposing it to the fuel. The end result of Steps 1 and 2 are the same, however, regardless of the order, in that immobilized (e.g., adsorbed) fuel is provided (or oxidant, in an oxidant-first process).

During Step 3, hydrogen is flushed from the chamber with an inert (to avoid any possibility of explosive mixtures of $H_2$ and $O_2$), and oxygen (oxidant) is flowed in. Since the electrical circuit is still open, current does not flow, $H_{ads}^+$ stays on the surface, but the voltage does rise due to the presence of oxygen. Ideally, the change in voltage should be 1.23 V.

During Step 4 (the power output step), the electrical circuit is closed and the ORR begins to consume $H_{ads}^+$. The WE discharges, pulling electrons through the load. By virtue of the extra driving force generated by the oxygen presence (the free energy of the ORR), there is the potential to extract more power during the discharge step than the charging step. The conditions most favorable to recover this work are to let the ORR proceed slowly. Specifically, one should not be in a kinetically limited discharge regime. This can be achieved by making the load resistance large, which effectively makes the discharge step Nernstian.

Figure 6:
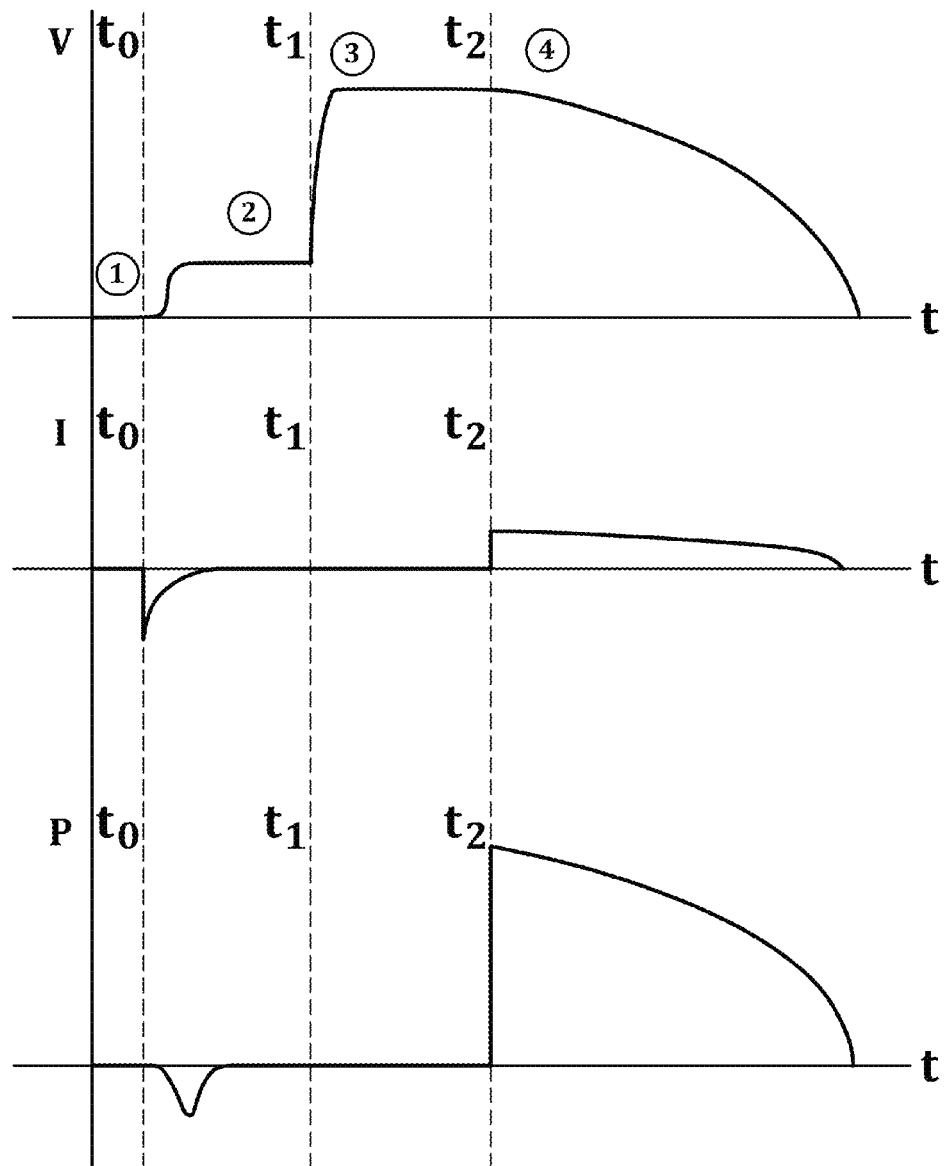
FIG. 6. The theoretical response versus time for the 4 step cycle shown in FIG. 5A. The voltage, current, and power vs. time are sketched and are labeled to indicate the step to which they correspond.

Increasing the magnitude of the load resistance in this circuit is analogous to increasing the mass transport resistance in chronoamperometry or cyclic voltammetry. The slow kinetics of the reaction can be given the time it needs by keeping the reaction transport limited. Thus, at all times, the WE is in equilibrium with the concentration on the electrode. As a result, the shape of the voltage decay is determined by the Nernst equation, which decreases logarithmically with decreasing surface concentration. Referring to FIG. 6, theoretically the area above the I(t) during step 2 should equal the area under the I(t) during step 4 due to charge conservation. Also, due to the increased voltage, the power output in step 4 is greater than the power input in step 2 (see FIG. 6). The simple MIM device consists of little more than the structure shown in the middle column of FIG. 5A inside an enclosure to control the gas phase environment, temperature, etc. This is described in more detail below.

Figure 5B:
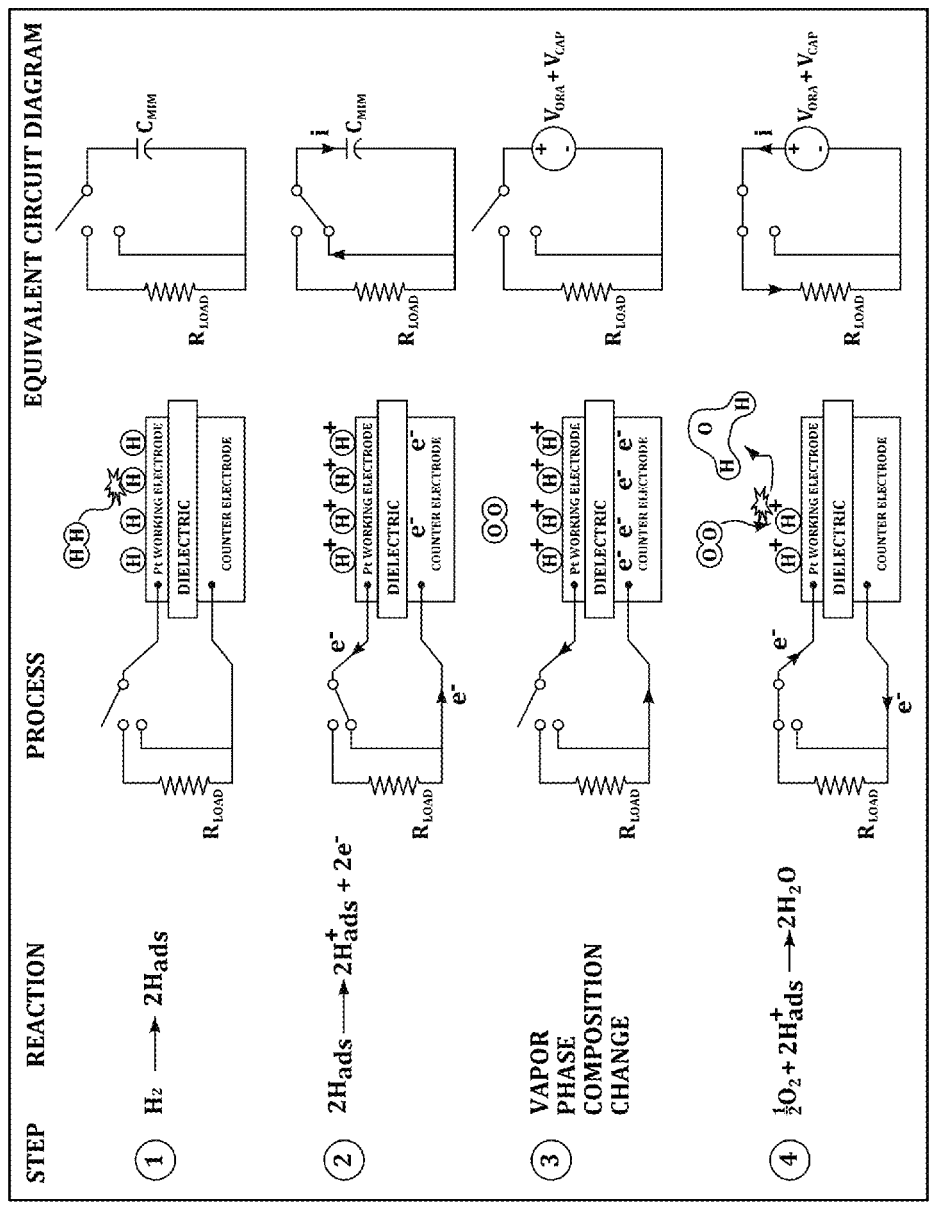
FIG. 5B illustrates a method and device similar to FIG. 5A but without an external voltage applied to bias the device. The device is instead charged by exposing the working electrode to the fuel to the extent that the device is polarized.

In one embodiment, the step of charging the capacitor results from exposing the working electrode to the fuel without additional applied bias. As noted above, FIG. 5B requires no external power to be input (i.e., no bias) into the device. It will be appreciated that while many of the exemplary devices provided herein are described in the context of a device charged by an external power source (e.g., FIG. 5A), any such device can also be implemented without external power as long as the introduction of fuel (or oxidant) to the working electrode is sufficient to charge the device. That is, charging without external power can be accomplished by selecting a fuel, WE, catalyst, CE, and dielectric such that the capacitor is polarized and charged upon exposure to the fuel (or oxidant in the case of an oxidant-first process). In the context of FIG. 5B, this means that Steps 1 and 2 are essentially a single step because exposing the WE to the fuel (or oxidant, in an oxidant-first process) also charges the capacitor.

In one embodiment, the step of charging the capacitor comprises applying a voltage between the working electrode and the counter electrode, as illustrated in FIG. 5A.

In one embodiment, the step of charging the capacitor by applying a voltage is performed prior to the step of exposing the working electrode to the fuel.

In one embodiment, the method further comprises a step of disconnecting the applied voltage between the working electrode and the counter electrode, prior to the step of exposing the working electrode to the oxidant.

In one embodiment, exposing the working electrode to the fuel provides adsorbed fuel on the working electrode.

In one embodiment, charging the capacitor provides oxidized or partially oxidized fuel on the working electrode and stored electrons in the counter electrode.

In one embodiment, the step of generating electrical power by connecting an electrical load between the working electrode and the counter electrode generates electrical power by providing the stored electrons in the counter electrode to the adsorbed fuel on the working electrode, thereby allowing the adsorbed fuel on the working electrode to react with the oxidant to produce an oxidant-fuel product.

The "fuel first" device is disclosed in the above aspect and embodiments. However, it will be appreciated that devices wherein the oxidant is first applied to the working electrode, with subsequently applied fuel to generate electricity.

Accordingly, in one aspect, an "oxidant first" method is provided. The capacitor device used can be the same or different from the "fuel first" device, however the structure is generally the same:

a working electrode, wherein the working electrode comprises a catalyst for the electrochemical reaction between the oxidant and the fuel;
a counter electrode; and
a dielectric that separates the working electrode and the counter electrode.

In one embodiment, the "oxidant first" method includes the steps of:

(a) immobilizing the oxidant on a working electrode of the capacitor by:
exposing the working electrode to the oxidant, wherein the working electrode comprises a catalyst for an electrochemical reaction between the fuel and the oxidant; and
charging the capacitor by biasing the working electrode such that it becomes negatively charged and biasing a counter electrode of the capacitor such that it becomes positively charged, wherein a dielectric of the capacitor separates the counter electrode from the working electrode, and wherein charging the capacitor is performed either before or after exposing the working electrode to the fuel;

(b) exposing the working electrode to the fuel after the oxidant has been immobilized on the working electrode; and (c) generating electrical power by connecting an electrical load between the working electrode and the counter electrode.

It will be appreciated that while fuel-first devices are primarily described herein, any such device can be implemented in an oxidant-first configuration by adjusting the method to have a working electrode capable of adsorbing the oxidant and to have the oxidant applied to the device before the fuel.

In one embodiment, the step of charging the capacitor results from exposing the working electrode to the oxidant without additional applied bias.

In one embodiment, the step of charging the capacitor comprises applying a voltage between the working electrode and the counter electrode.

In one embodiment, the step of charging the capacitor by applying a voltage is performed prior to the step of exposing the working electrode to the oxidant.

In one embodiment, the method further comprises a step of disconnecting the applied voltage between the working electrode and the counter electrode, prior to the step of exposing the working electrode to the fuel.

In one embodiment, exposing the working electrode to the oxidant provides adsorbed oxidant on the working electrode.

In one embodiment, charging the capacitor provides reduced or partially reduced oxidant on the working electrode and stored positive charge in the counter electrode.

In one embodiment, the step of generating electrical power by connecting an electrical load between the working electrode and the counter electrode generates electrical power by providing the stored positive charge in the counter electrode to the adsorbed oxidant on the working electrode, thereby allowing the adsorbed oxidant on the working electrode to react with the fuel to produce an oxidant-fuel product.

Composition of the Fuel, Oxidant, and Capacitor

The general composition of the fuel, oxidant, and capacitor will now be described.

The fuel is a source of electrons. A typical fuel is hydrogen, although the method is not limited to the use of hydrogen fuel. However, several exemplary embodiments are described and/or illustrated using hydrogen as the fuel. It will be appreciated that any reference to hydrogen is exemplary and that any fuel could be substituted for hydrogen in such embodiments.

In one embodiment, the fuel is a neutral or ionic form of one or more of the following: hydrogen ($H_2$ or H); CO; $N_2$; NO; $NO_2$; sulfur; $SO_2$; syngas; hydrogen sulfide; hydrogen peroxide; lower alkanes (e.g., methane, ethane, etc.); all alkanes (including linear, branched, and cyclic species such as n-dodecane, isopentane, and cyclohexane, etc.); all alkenes (ethylene, propylene, etc.); all alkynes; all arenes (benzene, toluene, p-xylene, etc.); lower alkane alcohols (e.g., methanol, n-propanol, n-butanol, isobutanol, etc.); partially oxidized, hydroxylated, or sulfonated alkanes, alkenes, alkynes, and arenes; traditional motor fuels (e.g., gasoline, kerosene, diesel, JP12, and crude oil); biofuels (e.g., ethanol, cellulose, sugars, bio-oils from algae, etc.); lower amines (e.g., ammonia, hydrazine, methyl amine, etc.); boranes (e.g., borane, ammonia borane, diborane, etc.); acids (e.g., HCl, etc.); halogens (Cl2, Br2, etc.); solvated metal cations (e.g., V+2, Mn+2, Cr+3, and all other oxidation states); solvated metals and metal containing compounds (oxides, sulfides, hydroxides, hydrides, carbonyls, etc.); particulate metals and metal containing compounds (oxides, sulfides, hydroxides, hydrides, carbonyls, etc.); nanoparticles of any of the preceding; any chemical species that can be electrochemically oxidized; mixtures of any of the preceding; dilutions of the preceding with a solvent (e.g. water, dimethyl sulfoxide, acetonitrile, hexane, toluene, etc. to form fuels such as methanol in dimethyl sulfoxide, etc.) or gas (e.g., nitrogen, argon, carbon dioxide, etc. to form fuels such as hydrogen in nitrogen, etc.); and humidified versions of any of the preceding (e.g., hydrogen gas diluted with nitrogen gas that is humidified with water vapor).

The oxidant is a receptor of electrons. A typical oxidant is oxygen (e.g., as a component of air), although the method is not limited to the use of oxygen as an oxidant. However, several exemplary embodiments are described and/or illustrated using oxygen as an oxidant. It will be appreciated that any reference to oxygen or air is exemplary and that any oxidant could be substituted for oxygen or air in such embodiments.

In one embodiment, the oxidant is air or a neutral or ionic form of one or more of the following: oxygen, ozone, hydrogen peroxides, all peroxides, fluorine, chlorine, bromine, iodine, inorganic acids (e.g., nitric, sulfuric, hydrochloric, formic), organic acids (e.g., acetic acid, citric acid, etc.), hypochlorite, chlorate, water, solvated metal cations (e.g., $V+5$, $Mn+7$, $Cr+6$, and all other oxidation states), solvated metals and metal containing compounds (oxides, sulfides, hydroxides, hydrides, carbonyls, etc.), particulate metals and metal containing compounds (oxides, sulfides, hydroxides, hydrides, carbonyls, etc.), nanoparticles of any of the preceding, any chemical species that can be reduced, mixtures of any of the preceding, dilutions of the preceding with a solvent (e.g. water, dimethyl sulfoxide, acetonitrile, hexane, toluene, etc. to form an oxidant such as hydrogen peroxide in water, etc.) or gas (e.g., nitrogen, argon, carbon dioxide, etc. to form an oxidant such as chlorine in nitrogen, etc.), and humidified versions of any of the preceding (e.g., oxygen gas diluted with argon gas that is humidified with water vapor).

In one embodiment, the working electrode catalyst is selected from the group consisting of Pt, Pd, all noble metals, Ni, Co, Cu, all transition metals, alloys of the preceding, oxides (e.g., ceria, zirconia, yittria, YSZ, LSY, samaria, nickel oxide, etc.), supported catalysts (e.g., metals dispersed on oxides, carbon or other metals such as Pt), and combinations thereof.

In one embodiment, the counter electrode is selected from the group consisting of Al, Cu, Ni, Zn, steel, stainless steel, Pt, any metal, transparent conductors (e.g., ITO, FTO, etc.), conducting polymers (e.g., TCNQ, PEDOT:PSS, etc.), carbon materials (e.g., nanotubes, graphene, graphite, and conducting carbon), doped silicon (n-Si or p-Si), heavily doped silicon (n+-Si or p+-Si), any doped or heavily doped semiconductor, nanowires or nanoparticles of the preceding, and combinations thereof.

In one embodiment, the dielectric layer is selected from the group consisting of $SiO_2$, $HfO_2$, $ZrO_2$, $ZrSiO_4$, $SiHfO_2$, $Al_2O_3$, all oxides, ZnS, CdS, all sulfides, ZnSe, CdSe, all selenides, SiN, BN, GaN, all nitrides, diamond, silicon, SiC, all carbides, $SrTiO_3$, barium strontium titanate, all ferroelectrics, polyimide, mylar, all polymers, all block copolymers, all ionic liquids, an ion-gel, air, vacuum, water, any dielectric material, and combinations or layer of any of the preceding.

In one embodiment, the capacitor further comprises a porous layer covering the working electrode, wherein the porous layer allows diffusion, transport or vertical passage of the fuel or the oxidant to the working electrode from a space above the working electrode, but reduces diffusion, transport or horizontal passage (parallel to the porous layer surface) of the fuel or oxidant.

In one embodiment, the method further comprises an enhanced dielectric coating on the working electrode, the enhanced-dielectric coating having a dielectric constant higher than that of the working electrode. In one embodiment, the enhanced-dielectric layer is selected from the group consisting of a porous high dielectric constant film (e.g., $HfO_2$, $ZrO_2$, etc.), a high dielectric constant liquid (e.g., water, DMSO, etc.), or a combination thereof (e.g., coat with a high dielectric constant porous film and fill the pores with a high dielectric constant liquid).

Characteristics of the Electrical Load

In one embodiment, the electrical load is large such that the dynamics of the discharge do not exceed the dynamics of the working electrode reaction (e.g., the ORR for the case where hydrogen is initially adsorbed to the working electrode surface).

In one embodiment, the electrical load is entirely resistive.

In one embodiment, the electrical load has capacitive or inductive components.

In one embodiment, the magnitude of the electrical load is increased or reduced to increase the efficiency of the electricity generation.

Process Controls

In one embodiment, the method further comprises controlling the pressure above the working electrode to control coverage or adsorption of the fuel and/or the oxidant. Any given system (i.e., working electrode, fuel, and oxidant), will have optimal pressures for the fuel and oxidant. These pressures result from a need to quickly cover the surface of the working electrode with the fuel and oxidant, although too much surface coverage may result in efficiency losses.

In one embodiment, the method further comprises controlling the composition of the fuel or oxidant phase to control coverage or adsorption. The partial pressure of the fuel is set such that only the quantity necessary for the reaction is adsorbed onto the working electrode. Any additional adsorption will be consumed by parasitic processes (e.g., leakage currents), and would represent inefficiency in the system.

In one embodiment, the method further comprises controlling the temperature of the working electrode to control coverage, adsorption, absorption, or kinetics at the working electrode.

Exemplary Scheme for Continuous Operation and AC Power

The amount of power generated by a single capacitor can be enhanced by increasing the surface area of the working electrode and/or cycling the device frequently (e.g., many times per second). Schemes for cycling are described below.

Figure 7A:
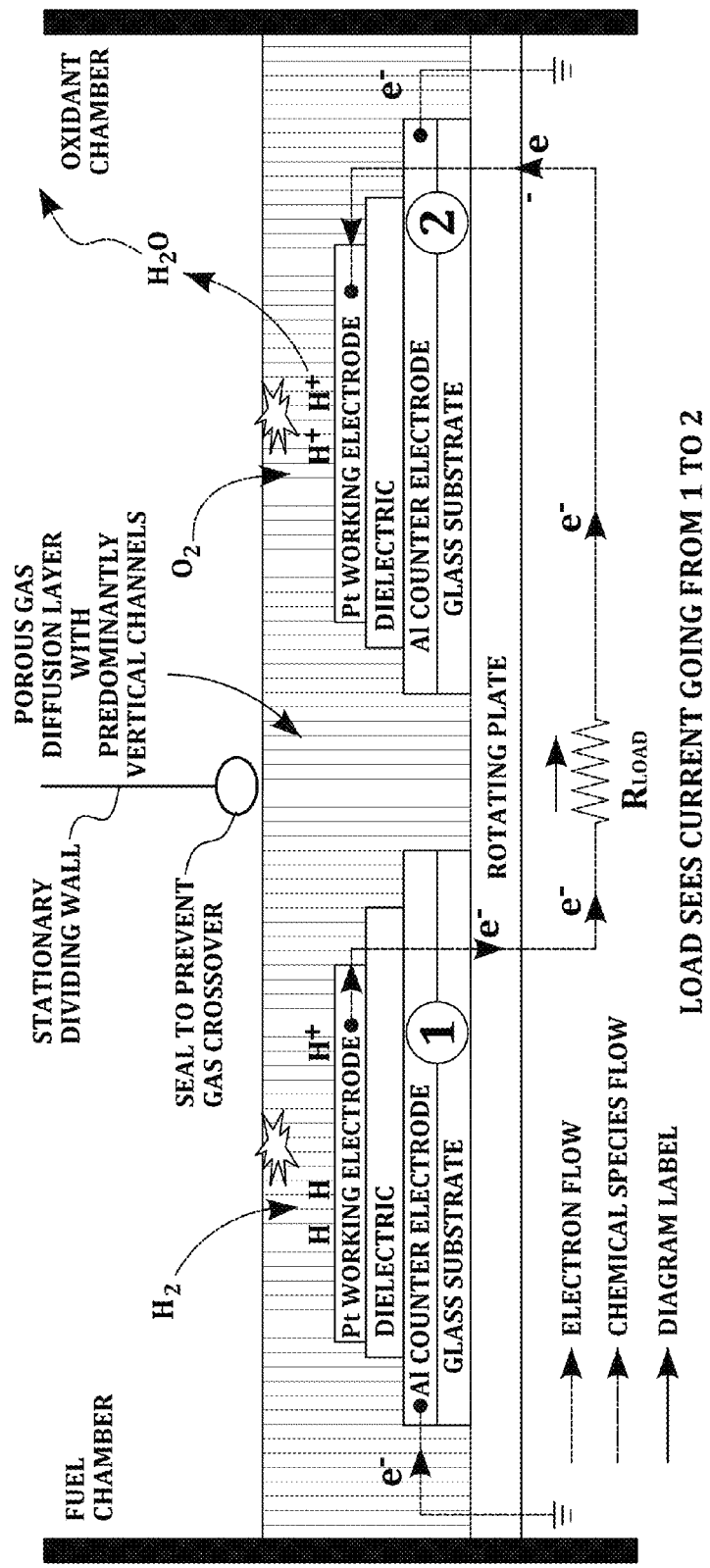
FIGS. 7A-7C. Schematic of rotating disk design with two MIM stacks on the disk. A top-view of the cylindrical device is shown (FIG. 7C) while two cross sectional views are shown (FIGS. 7A AND 7B) for two different times. Note that the disk has rotated 180° between the top and bottom figure. The current that flows is AC and has the waveform shown in FIG. 8 below. Also, a porous layer above the MIM may be used to prevent damage to the MIM from the seal on the separator.
Figure 7B:
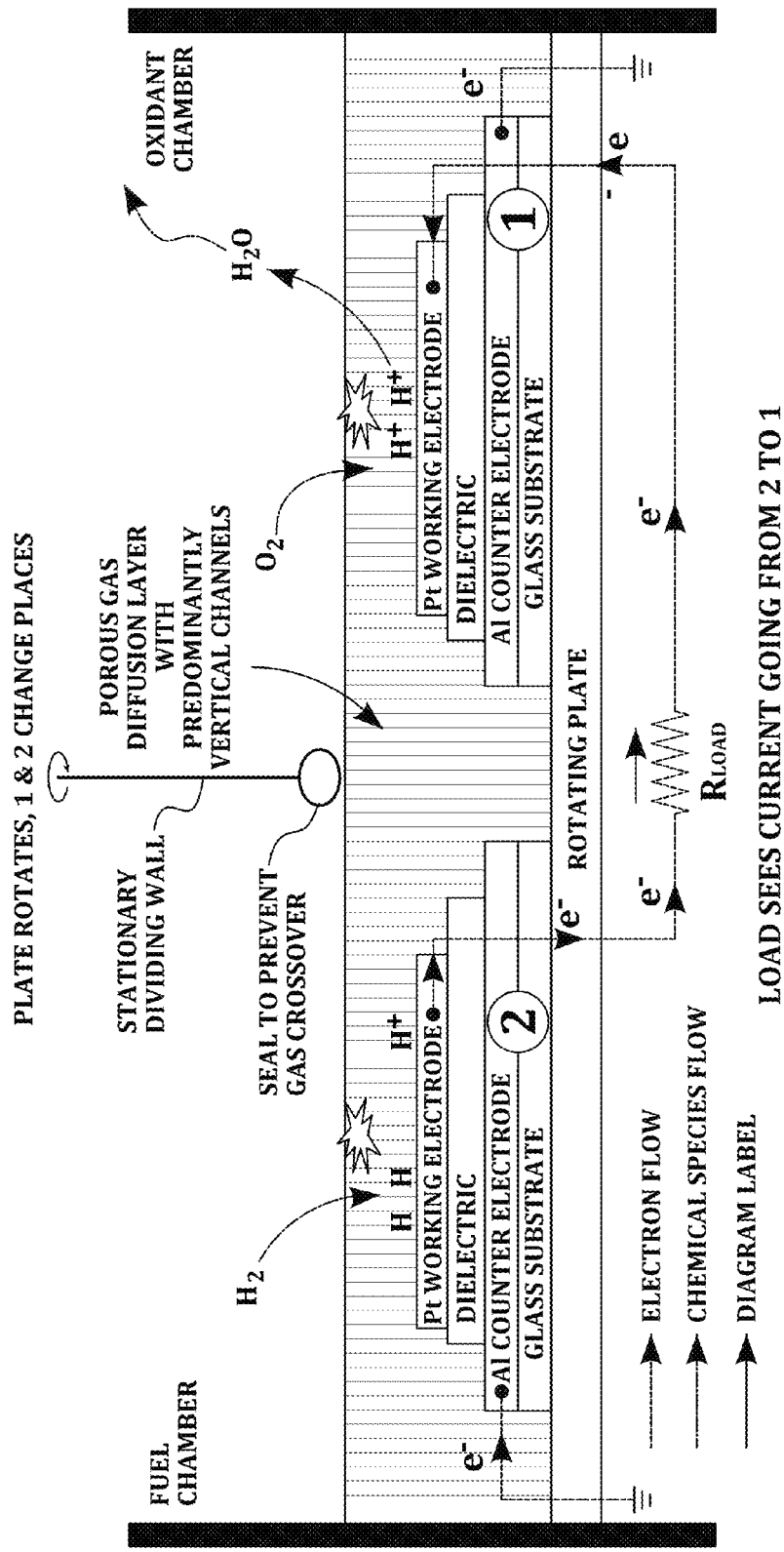
Figure 7C:
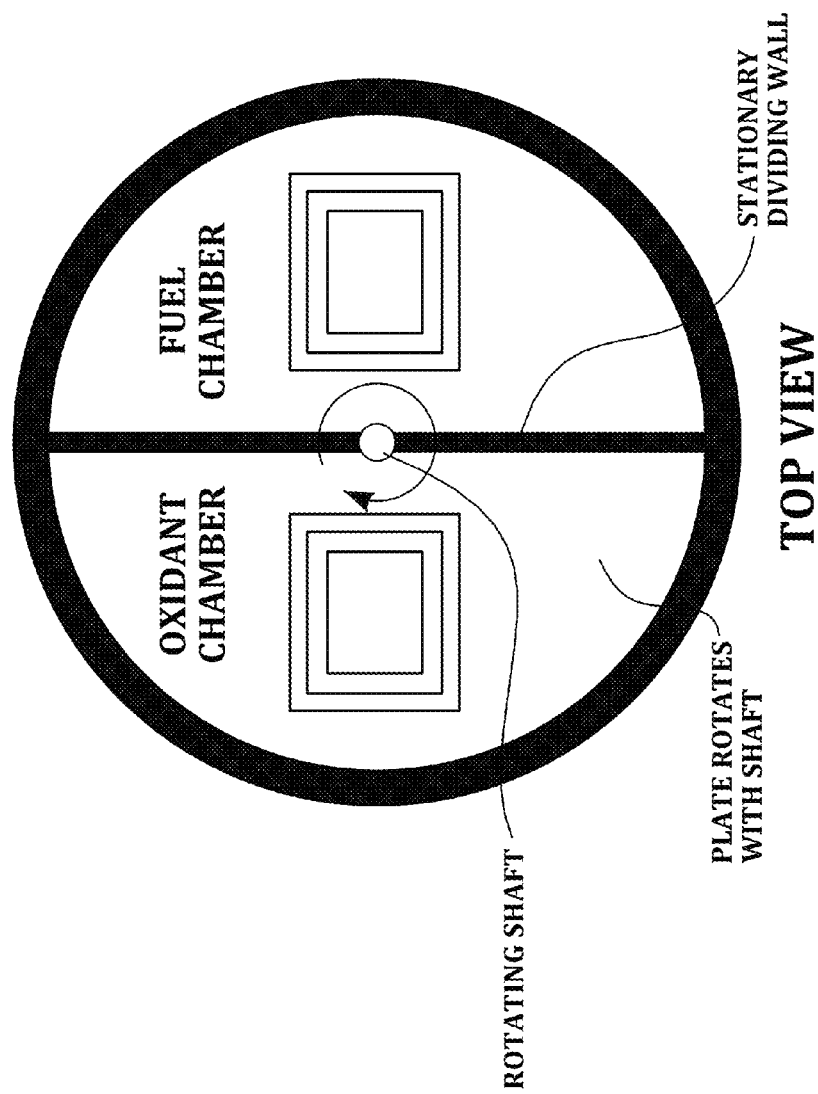
Figure 8:
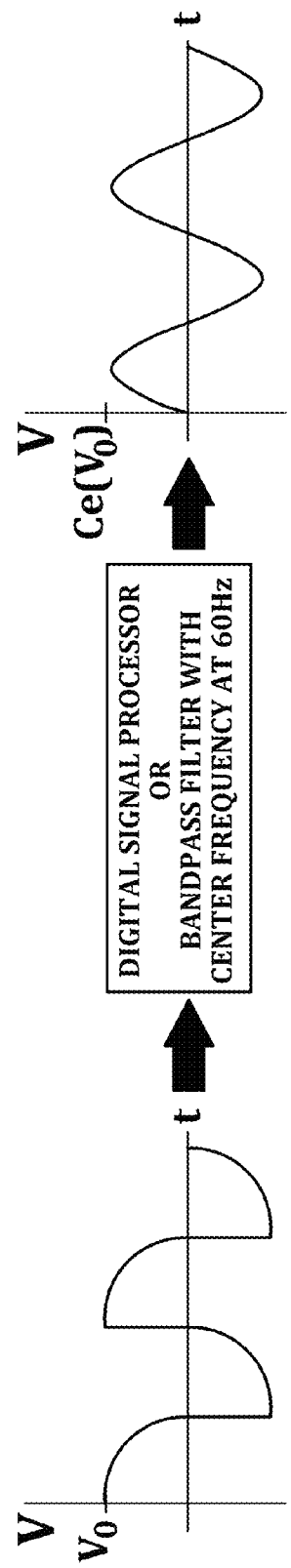
FIG. 8. Expected AC waveform from the device shown in FIGS. 7A-7C can be conditioned to a standard 60 Hz sine wave with conversion efficiency $C_e$, where $0 \leq C_e < 1$ and $V_o$ is the maximum amplitude of the pre-processed signal.

Referring to FIGS. 7A-7C, one embodiment is provided where two separate MIM devices labeled 1 and 2 are mounted on a plate. The gas phases above them are kept separate by a separator and a seal. At some initial time, MIM 2 is exposed to oxygen in chamber 2 and is beginning its ORR (discharging, as shown in FIGS. 5A and 6, step 4) while connected to one side of the load. At the same moment MIM 1 is exposed to hydrogen in chamber 1 and beginning its HOR (charging, as shown in FIGS. 5A and 6, step 2) while connected to the other side of the load. MIM 2 will pull electrons from the working electrode of MIM 1 through the load. After the decay of the voltage, the plate is rotated such that MIM 2 is in chamber 1 and MIM 1 is in chamber 2. The reaction may be run again, but this time it will pull current through in the opposite direction. The gasses stay stationary, but the plate rotates, creating AC power at the frequency of rotation. This AC signal would not be in the sinusoidal form of conventional AC power, but it could be conditioned into a sine wave quite easily (FIG. 8). Brush contacts allow the rotation of the plate while still contacting the plate electrically.

In one embodiment, the capacitor is the electrical load for a second capacitor. For example, the voltage applied to one capacitor device during step (b) of either the fuel-first or oxidant-first methods is supplied by step (d) of a similar method operating on a separate capacitor device.

Pulsed Gas Systems

In certain embodiments, pulsed gas systems are provided whereby the capacitor device is essentially stationary and the fuel and oxidant are passed above the working electrode in phases so as to perform the steps of the power-generation method.

Figure 9:
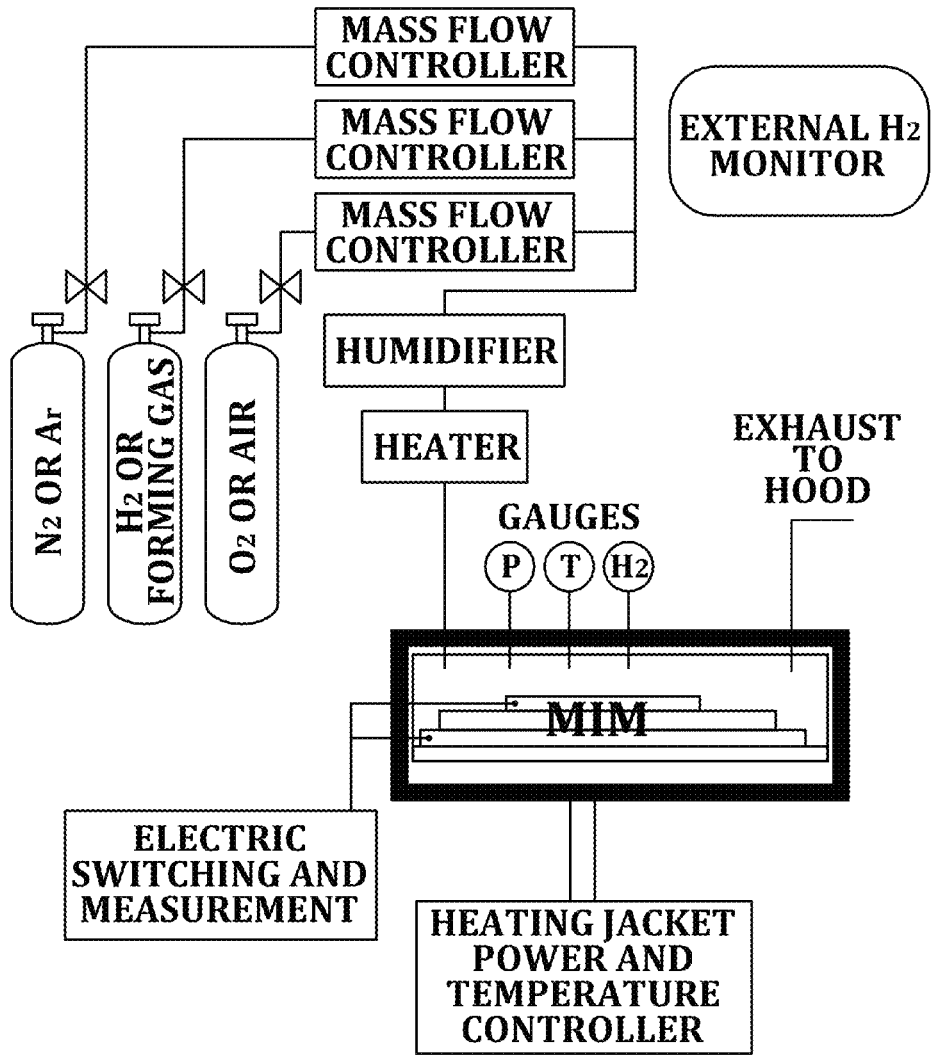
FIG. 9. Experimental setup for gas flow method.
Figure 10:
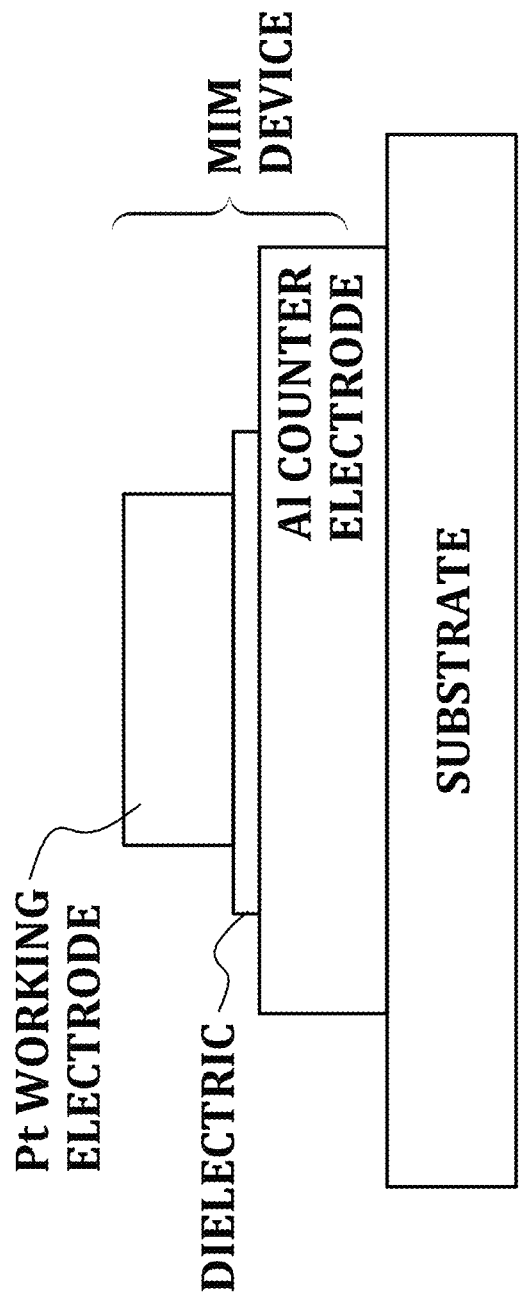
FIG. 10. Detail of a metal-insulator-metal device and sample holder.

The general experimental apparatus and MIM device are shown schematically in FIGS. 9 and 10. A small chamber is fabricated to hold the MIM device. It has ports for electrical feed-throughs (push-pin contacts), ports for pressure, temperature, and hydrogen concentration measurements. The later is important to ensure there is never an explosive mixture in the cell. The chamber has a small volume and is relatively flat so as to reduce the time it takes to flush out one of the gasses.

An exemplary MIM device is illustrated in FIG. 10 and is constructed layer-by-layer. First, a layer of aluminum (200 nm) is deposited onto a cleaned substrate by thermal evaporation to form the counter electrode. A dielectric, such as Kapton, silica, or a high-k dielectric material is formed on the aluminum layer. The dielectrics tested can be prepared and applied using a sol gel spin coating method or other method known to those of skill in the art. Lastly, the platinum working electrode is deposited by evaporation or coating the dielectric layer with Pt nanoparticles or nanowires to provide more interfacial area between the Pt and the dielectric.

Figure 11:
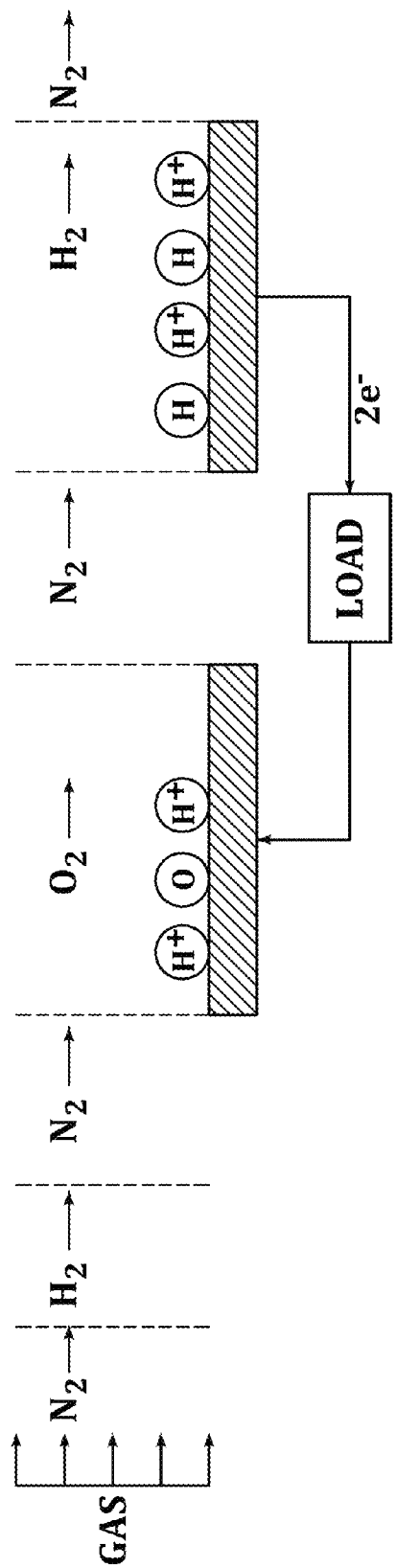
FIG. 11 illustrates a representative method for providing fuel and oxidant to generate electrical power using a capacitor, in accordance with the embodiments provided herein.

FIG. 11 illustrates a representative method for providing fuel and oxidant to generate electrical power using a capacitor, in accordance with the embodiments provided herein. Referring to FIG. 11, a fuel ($H_2$) and an oxidant ($O_2$) are passed above the working electrode of a capacitor. In the illustrated embodiment, an inert gas ($N_2$) is provided intermediate the fuel and the oxidant so as to prevent mixing of the two. In the illustrated embodiment, two working electrodes are provided, each of which is in contact with a different one of the fuel and the oxidant at any given time, so as to drive current to the load in an alternating current fashion. For example, when the fuel is in contact with the working electrode, electrons are driven from that working electrode, through the load, and to the working electrode in contact with the oxidant. When the oxidant and the fuel are switched, the flow of electrons changes directions, but a current still flows through the load.

By allowing the capacitor to remain stationary, the fuel, oxidant, and optional inert gas can be passed over the working electrodes in a pulsed manner, as delivered by gases or liquids plumbed to deliver the compounds in a segregated and regimented manner. For example, the experimental setup of FIG. 9 could be used to provide such oscillating composition of fuel and oxidant. By quickly oscillating the composition above the working electrodes, a particular frequency of alternating current can be achieved. For example, if the oxidant and fuel are delivered such that the composition above the working electrodes of two devices changes 60 times per second, the resulting current will have a 60 Hz oscillating alternating current.

Figure 12:
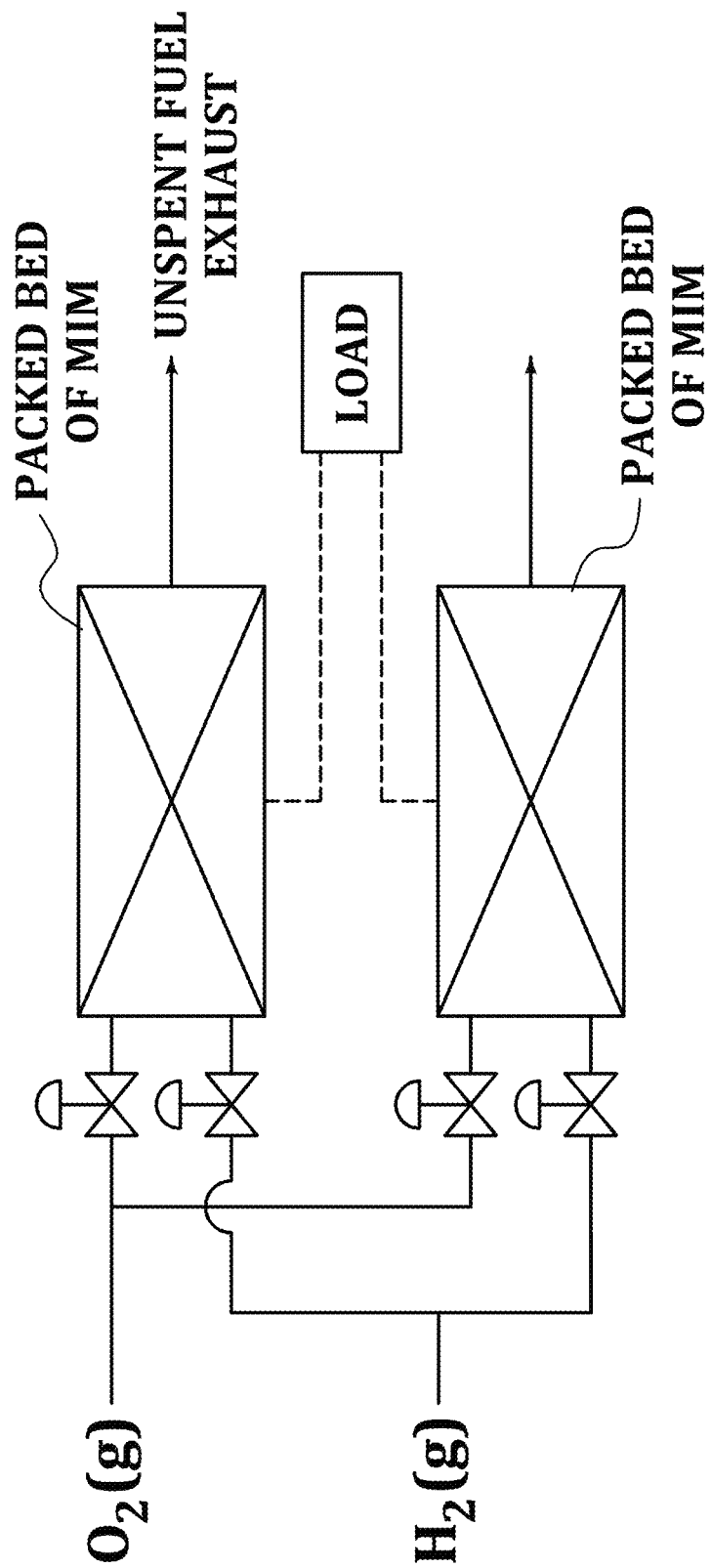
FIG. 12 illustrates an exemplary system for generating power using "packed bed" configurations of capacitors connected to fuel and oxidant delivery systems.

The pulsed gas system described with reference to FIGS. 9 and 11 can be extended to large scale systems, such as that illustrated in FIG. 12. FIG. 12 illustrates an exemplary system for generating power using "packed bed" configurations of capacitors connected to fuel and oxidant delivery systems. In the exemplary embodiment illustrated in FIG. 12, oxygen and hydrogen are provided as the oxidant and the fuel, respectively, in gas form, which are controllably connected to two "packed beds" filled with a plurality of capacitors in a high-density configuration. For example, each of the boxes in FIG. 12 may contain 100 or more capacitors. The capacitors are electrically connected to a common load and the two packed beds are each connected to the common load in such a way that a current flows through the load because one of the packed beds is exposed to oxygen while the other is exposed to hydrogen. The fuel and oxidant are then switched, such that the gas flowing through the beds is switched and, therefore, an alternating current is generated. It will be appreciated that an inert gas can also be used to purge the packed beds in between the fuel and oxidant. The exemplary system illustrated in FIG. 12 would be particularly useful for generating large amounts of power, due to the potential for high device density. The power generated would likely not be at typical AC frequencies, and so the output may be switched such that the load sees a direct current instead of an alternating current. However, it will be appreciated that those of skill in the art could manipulate such high density systems to provide any alternating or direct current desired.

In one embodiment, the steps of exposing the working electrode to the fuel and the oxidant comprise flowing the oxidant and the fuel over the working electrode, separately.

In one embodiment, a purge step is performed intermediate the flowing of the fuel and the oxidant over the working electrode, wherein the purge step comprises flowing a gas or liquid over the working electrode that does not react with the working electrode.

Moving-Device Systems

Rotating devices have been described previously with regard to FIG. 7. Additional details and device designs will now be discussed.

Any conceivable means for exposing the working electrode to alternating fuel and oxidant environments can be used. While rotating and conveyor systems are disclosed specifically, the invention is not limited to such embodiments.

In one embodiment, the capacitor is configured to move alternatingly through a fuel region and an oxidant region, with the fuel and oxidant regions separated by a barrier to prevent mixing of the fuel and oxidant gases or liquids.

In one embodiment, the method further comprises an exhaust region intermediate and sealed from the fuel and oxidant regions as the working electrode is moved between regions.

In one embodiment, multiple capacitors are mounted on a solid surface and moved between the regions, wherein the multiple capacitors can be electrically connected independently, electrically connected together in series or parallel, electrically connected in any combination of these, or electrically connected differently as a function of time.

In certain embodiments, a rotating support can be used to move the working electrode between the fuel and the oxidant.

In one embodiment, the capacitor is configured to rotate in a rotation plane, wherein the rotation plane comprises the fuel region, configured to expose the working electrode to the fuel, and the oxidant region, configured to expose the working electrode to the oxidant; and wherein the method further comprises a step of rotating the capacitor between the fuel region and the oxidant region to perform the steps of exposing the working electrode to the fuel and the oxidant, respectively.

In one embodiment, the method further comprises an exhaust region intermediate, and sealed from, the fuel region and the oxidant region in the rotation plane, wherein the step of generating electrical power is performed when the working electrode is in the exhaust region.

In one embodiment, multiple capacitors are mounted on a rotation plane and rotated between the regions, wherein the multiple capacitors can be electrically connected independently, electrically connected together in series or parallel, electrically connected in any combination of these, or electrically connected differently as a function of time.

Multiple working electrodes can be moved between the fuel and oxidant regions.

In one embodiment, the step of moving the plurality of capacitors comprises moving the capacitors such that a first capacitor is in the fuel region while a second capacitor is in the oxidant region.

In one embodiment, the plurality of capacitors are all mounted on the same side of the substrate.

In one embodiment, at least one of the plurality of capacitors is mounted on an opposite side of the substrate.

Figure 13A:
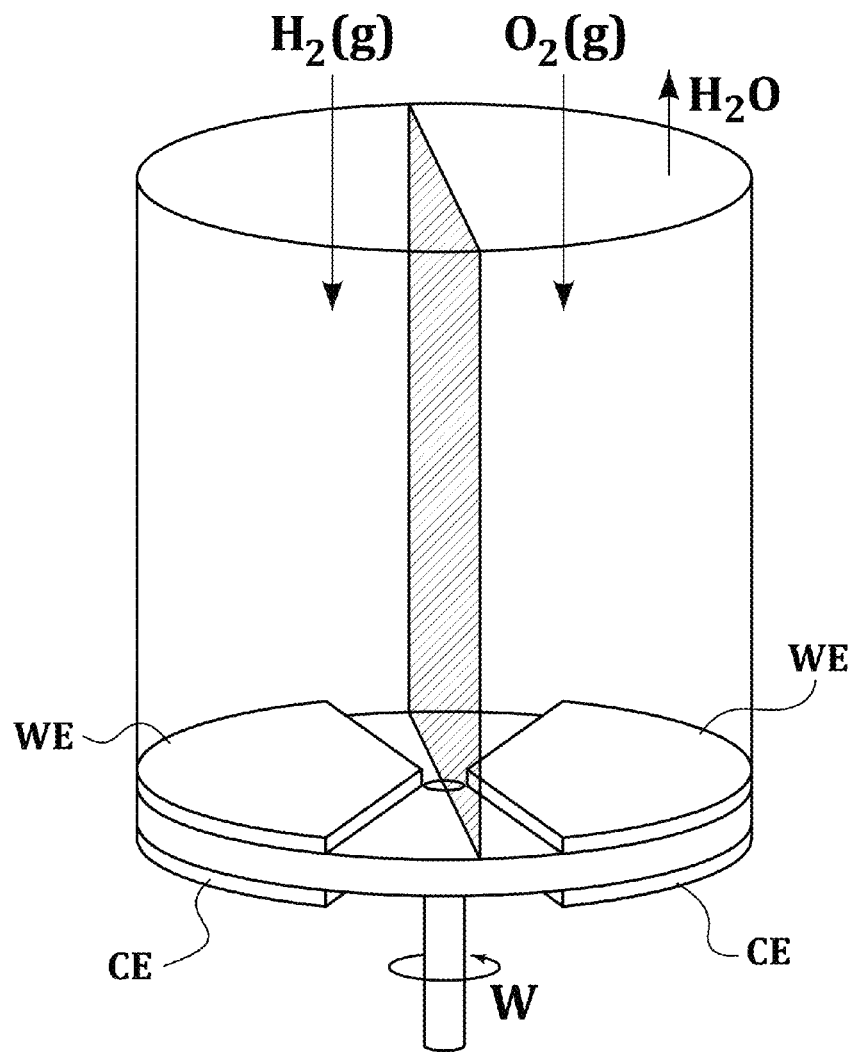
FIGS. 13A and 13B illustrate an exemplary rotating device system that includes two rotated working electrodes and stationary gas phases.
Figure 13B:
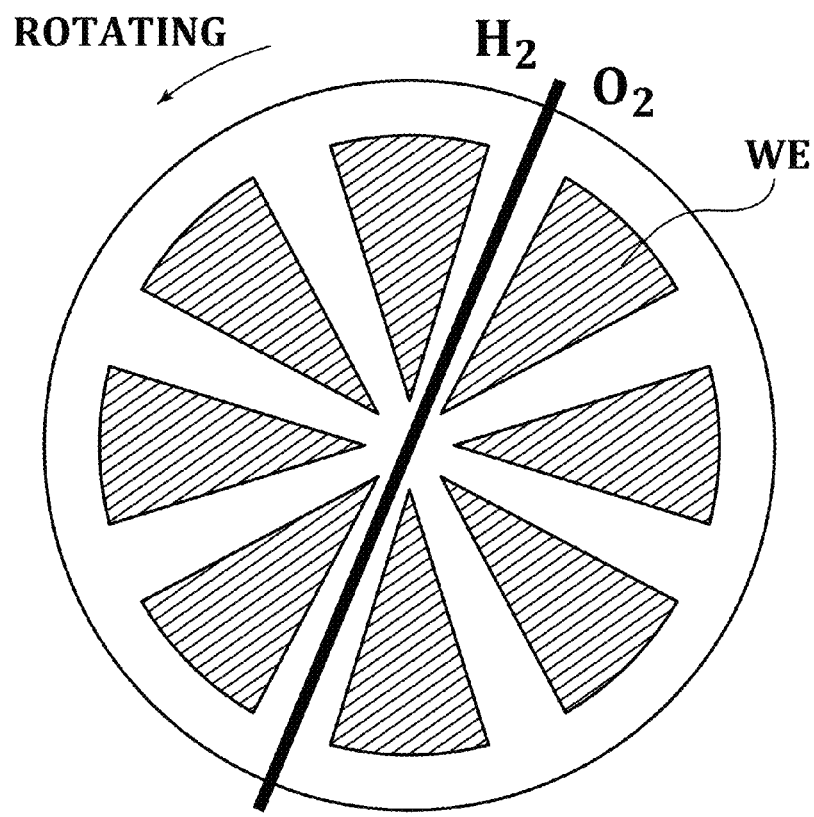

FIGS. 13A and 13B illustrate an exemplary rotating device system that includes two rotated catalytic electrodes with stationary gas phases. Specifically, two working electrodes are exposed to a top surface of a rotating disk. The rotating disk rotates between a fuel region and an oxidant region such that it is possible for an entire first working electrode to be in the fuel region while an entire second working electrode is in the oxidant region. By rotating the disk, the working electrode is exposed to the fuel and oxidant in an oscillating manner, as required by the methods provided herein. The working electrodes and counter electrodes are connected as necessary to charge and discharge the capacitor to produce electrical power. It will be appreciated that many different design schemes can be used in such a rotating disk method. As illustrated in the second sketch in FIG. 13, the working electrodes can take any number of shapes, and any number of working electrodes can be disposed on the rotating disk. That is, the devices are not limited such that only one working electrode can be in one of the fuel or oxidant regions at one time.

By including multiple working electrodes, one of skill in the art will appreciate that the devices can be connected in such a way as to increase the frequency of the pulses (e.g., the AC power generated) because the paired working electrodes will be producing alternating current at a rate equal to the speed of rotation of the disk times the number of pairs of working electrodes.

In one embodiment, the plurality of capacitors are in electronic communication such that the working electrodes are connected to opposite terminals of the same electric load.

In one embodiment, the plurality of capacitors are electrically connected to provide a desired voltage, current, pulsed voltage, pulsed current, or alternating current frequency.

In one embodiment, the plurality of capacitors have working electrodes disposed within a plurality of fuel chambers, oxidant chambers, and exhaust chambers.

Figure 14A:
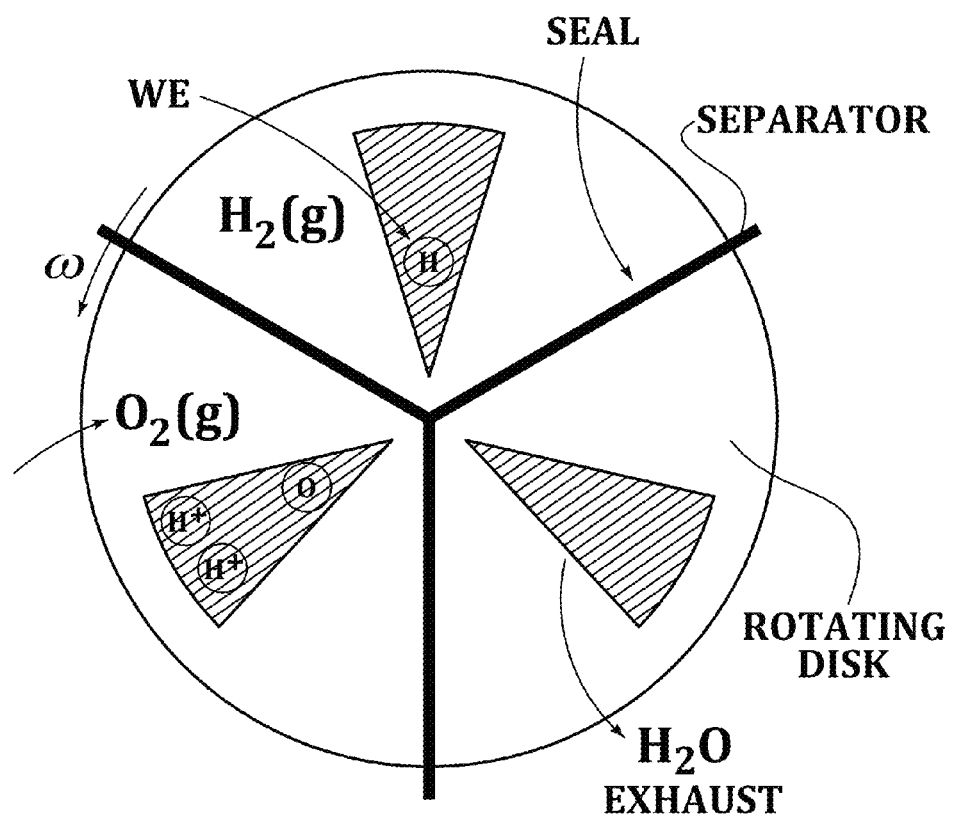
FIG. 14A illustrates a three-chamber rotating disk device wherein a fuel chamber, an oxidant chamber, and an exhaust chamber are all disposed separately above the rotating disk.
Figure 14B:
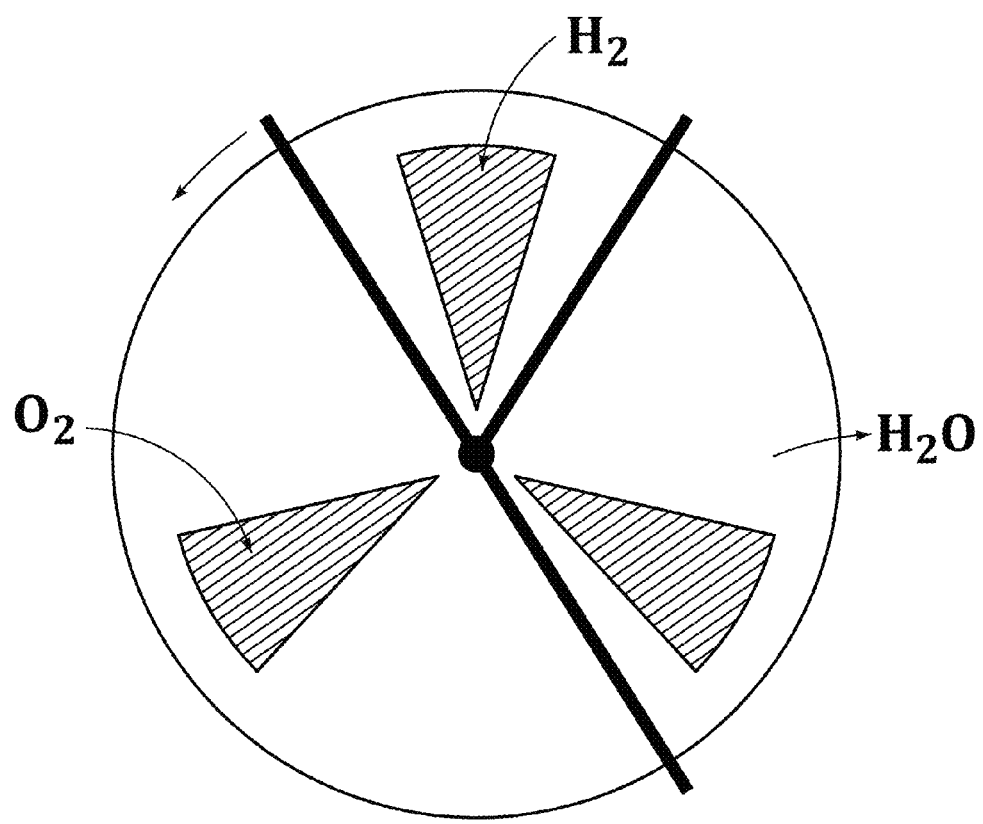
FIG. 14B is a modified version of the device of FIG. 14A, wherein the fuel chamber is larger than the oxidant and exhaust chambers.

It will be appreciated that the rotating disk devices as illustrated herein can include three or more separate chambers containing fuel, oxidant, and optional chambers providing inert gases or exhaust ports. FIG. 14A illustrates a three-chamber rotating disk device wherein a fuel chamber, an oxidant chamber, and an exhaust chamber are all disposed separately above the rotating disk. In the illustrated exemplary embodiment wherein the fuel is hydrogen, the oxidant is oxygen, and the product of the method is water, the exhaust chamber is listed as an $H_2O$ exhaust. However, it will be appreciated that when the composition of the fuel and/or oxidant is different, the exhaust chamber will be configured to exhaust (dispose of) whatever the reaction product remaining on the working electrode after a power generation cycle is. FIG. 14B illustrates a modified version of the device of FIG. 14A, wherein the oxidant chamber is larger than the fuel and exhaust chambers. Such a modification illustrates a possible design modification that can be used to control pressure, concentration, etc., as well as to illustrate that an equally proportionate chamber division (e.g., FIG. 14A) is not necessary.

Figure 16A:
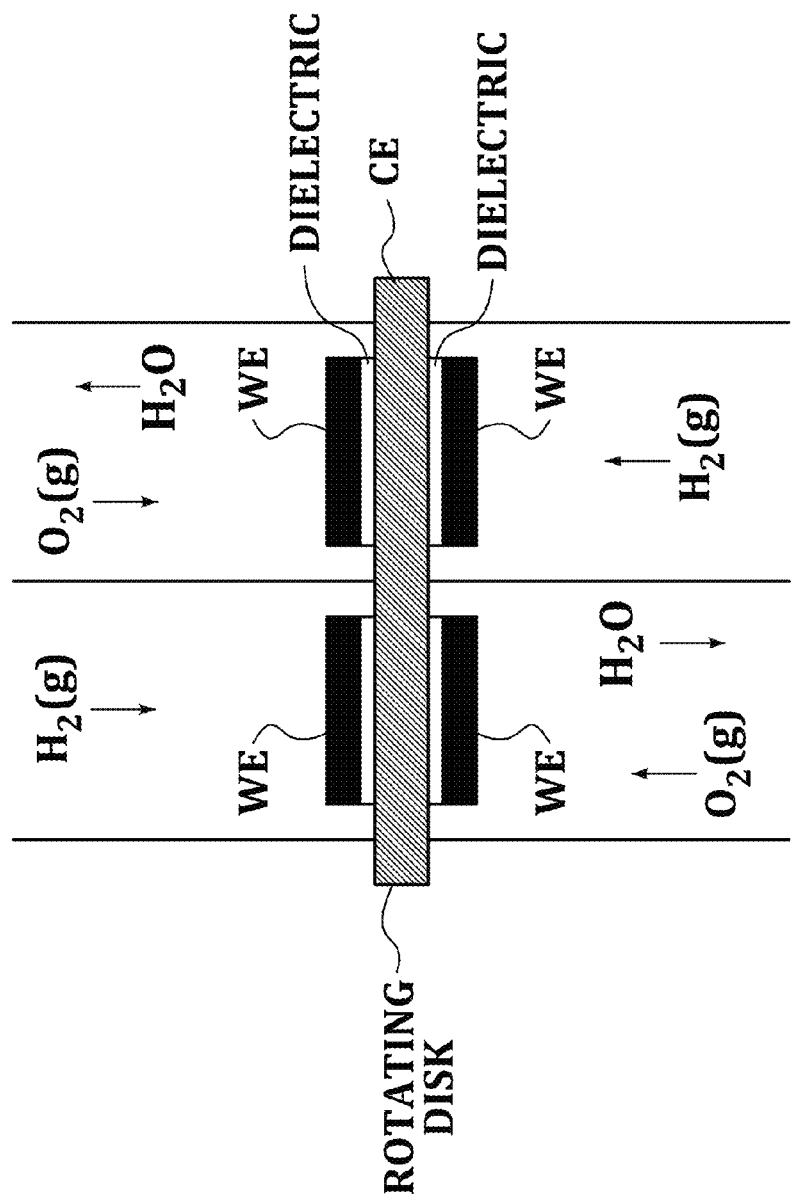
FIGS. 16A and 16B illustrate double-sided disk devices, wherein a mechanical support is used to support capacitors mounted to both a top and a bottom side of the support.
Figure 16B:
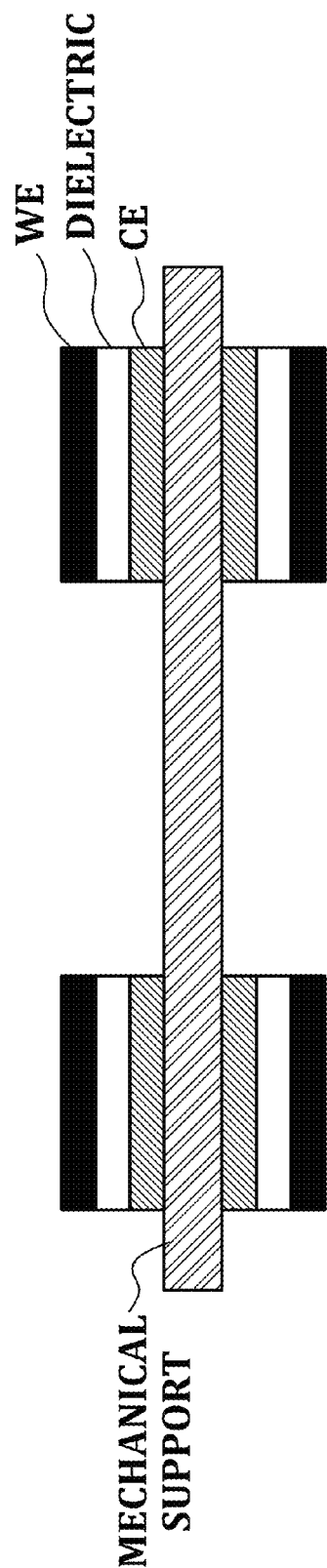

Double-sided devices can also be used with rotating disk, or other device configurations. In FIGS. 16A and 16B, double-sided devices are illustrated, wherein a mechanical support is used to support capacitors mounted to both a top and a bottom side of the support. The top and bottom sides of the support are exposed to the fuel and oxidant as necessary to drive the flow of current through a load. By using a double-sided rotating disk, the capacity of the device is essentially doubled. The support can be the CE (e.g., FIG. 16A) or can be separate from the CE (e.g., FIG. 16B).

Conveyor Belt Systems

Figure 15A:
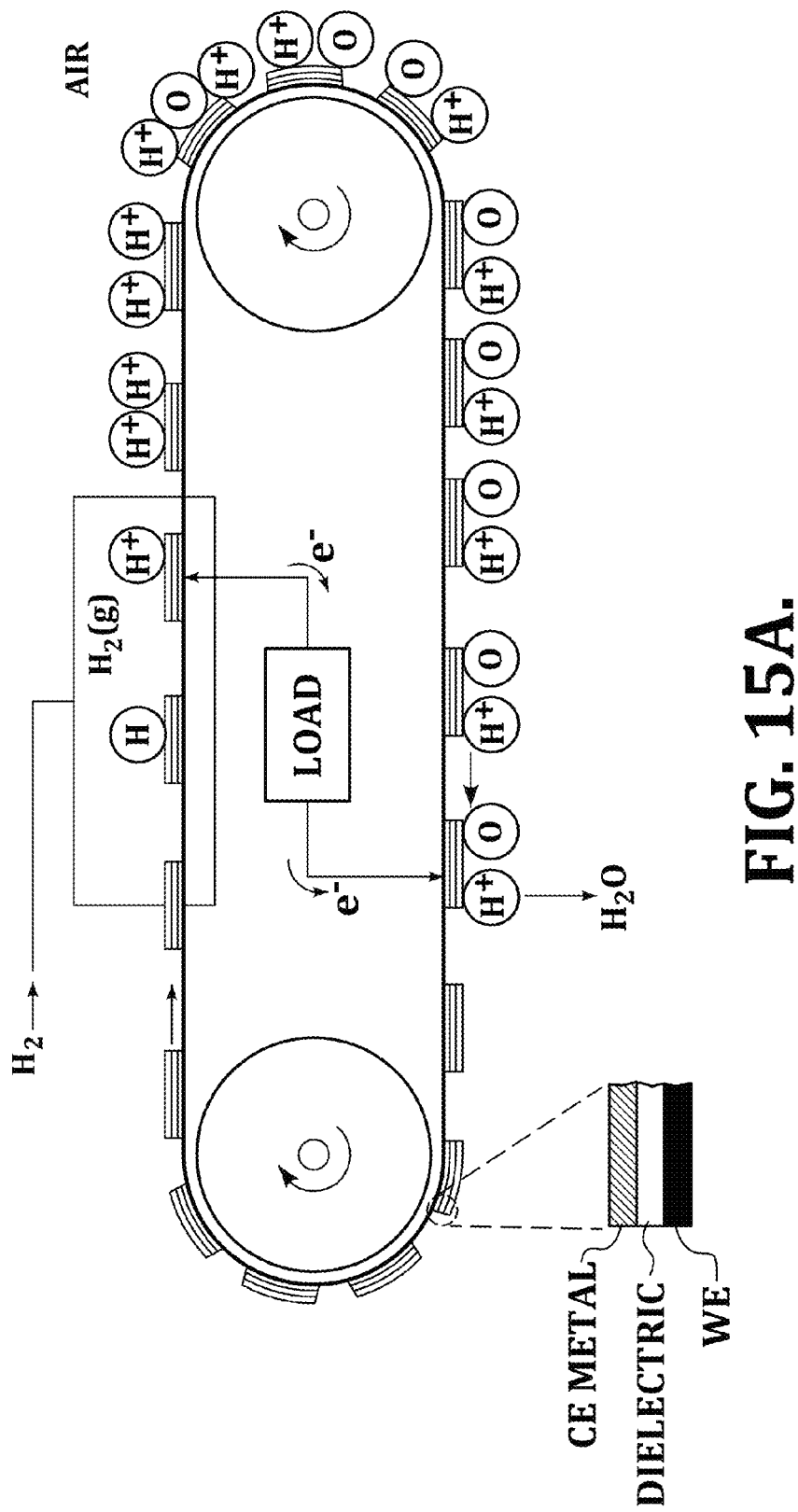
FIG. 15A illustrates a "conveyor belt" style device whereby a plurality of capacitors are mounted on a belt that mechanically moves the capacitors between a fuel region and an oxidant region (hydrogen and air, respectively).
Figure 15B:
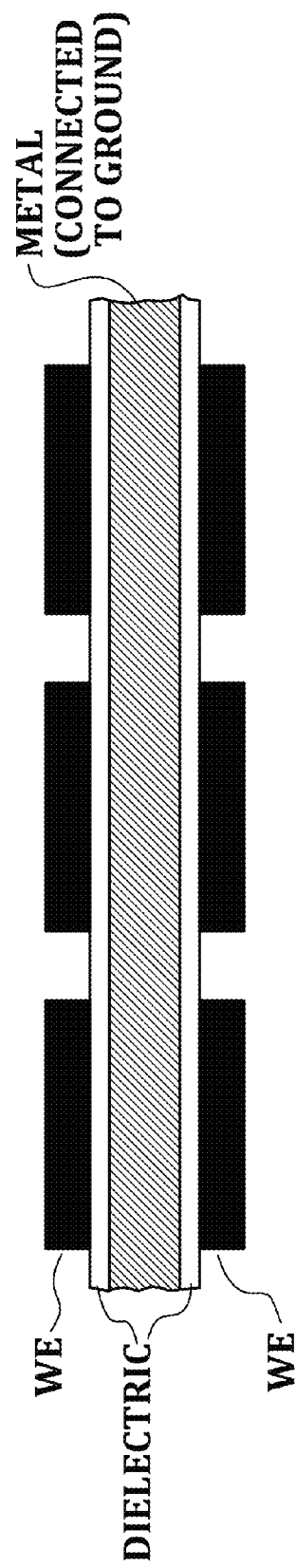
FIG. 15B illustrates an alternative "two-sided" MIM device that could be used with the conveyor belt system of FIG. 15A.

In addition to the rotating disk devices described herein, other means for mechanically moving the capacitor between fuel and oxidant regions are also provided. For example, FIGS. 15A and 15B illustrate a "conveyor belt" style device whereby a plurality of capacitors are mounted on a belt that mechanically moves the capacitors between a fuel region and an oxidant region (hydrogen and air, respectively). By connecting the capacitors properly, electrons flow through a load to generate a current. As illustrated in FIG. 15B, a double layer belt is also contemplated so as to double the capacity of the device.

In one embodiment, the capacitor is mounted to a conveyor belt that moves the working electrode between the fuel region and the oxidant region.

In one embodiment, the method further includes an exhaust region intermediate, and sealed from, the fuel region and the oxidant region along the path of the conveyor belt, wherein the step of generating electrical power is performed when the working electrode is in the exhaust region.

In one embodiment, multiple capacitors are mounted on a conveyor belt and moved between the regions, wherein the multiple capacitors can be electrically connected independently, electrically connected together in series or parallel, electrically connected in any combination of these, or electrically connected differently as a function of time.

Enhanced Surface Area Devices

Figure 17A:
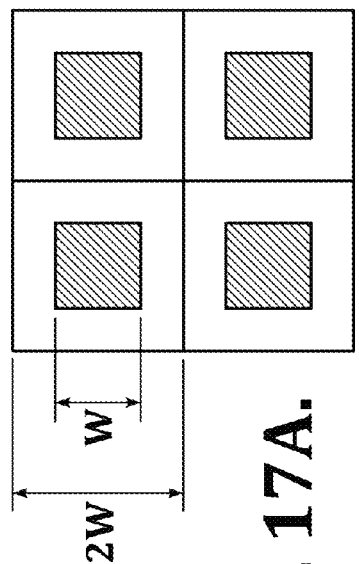
FIGS. 17A and 17B illustrate an exemplary device configuration having an enhanced-area working electrode. An overhead view is illustrated in FIG. 17A, and a cross-sectional view is illustrated FIG. 17B.
Figure 17B:
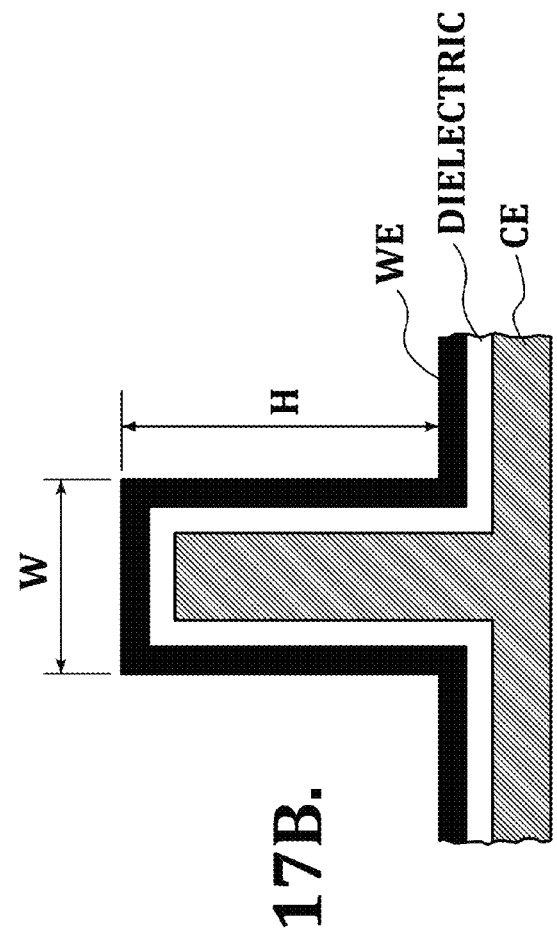

FIGS. 17A and 17B illustrate an exemplary device configuration having an enhanced area working electrode. FIG. 17A is a top plan view. FIG. 17B is a cross-sectional view. While square posts projecting from the surface of the device are illustrated, it will be appreciated that any other shape is contemplated, such as cylinders and other three-dimensional polygons. It will also be appreciated that the projections need not extend exactly perpendicular to the surface of the device, as illustrated, but traditional fabrication methods (e.g., lithography and thin film depositions) make such perpendicular projections preferable. It will be noted in the cross-sectional view in FIG. 17B that the counter electrode forms the core of the post, and the dielectric and working electrode are conformally coated on the post such that the thickness of the dielectric and the working electrode are consistent regardless of whether on the horizontal or vertical surfaces of the device (to the extent possible based on the fabrication methods).

In one embodiment, the capacitor has a high surface area configuration comprising a plurality of pillars or ridges projecting from the working electrode surface of the capacitor.

In a further embodiment, the plurality of pillars or ridges each has a core comprising the counter electrode, the dielectric coating the counter electrode, and the working electrode coating the dielectric.

In one embodiment, the capacitor is comprised of a plurality of nanowires that act as the counter electrode, wherein each nanowire is coated with the dielectric layer and the dielectric layer is coated with the working electrode layer to form a core/shell/shell wire structure (e.g, Ag metal nanowire core counter electrode/$ZrO_2$ dielectric shell/Pt nanoparticle working electrode or n+-Si nanowire core counter electrode/$SiO_2$ dielectric shell/Pt impregnated carbon nanoparticle layer working electrode).

Device Variations

Figure 18A:
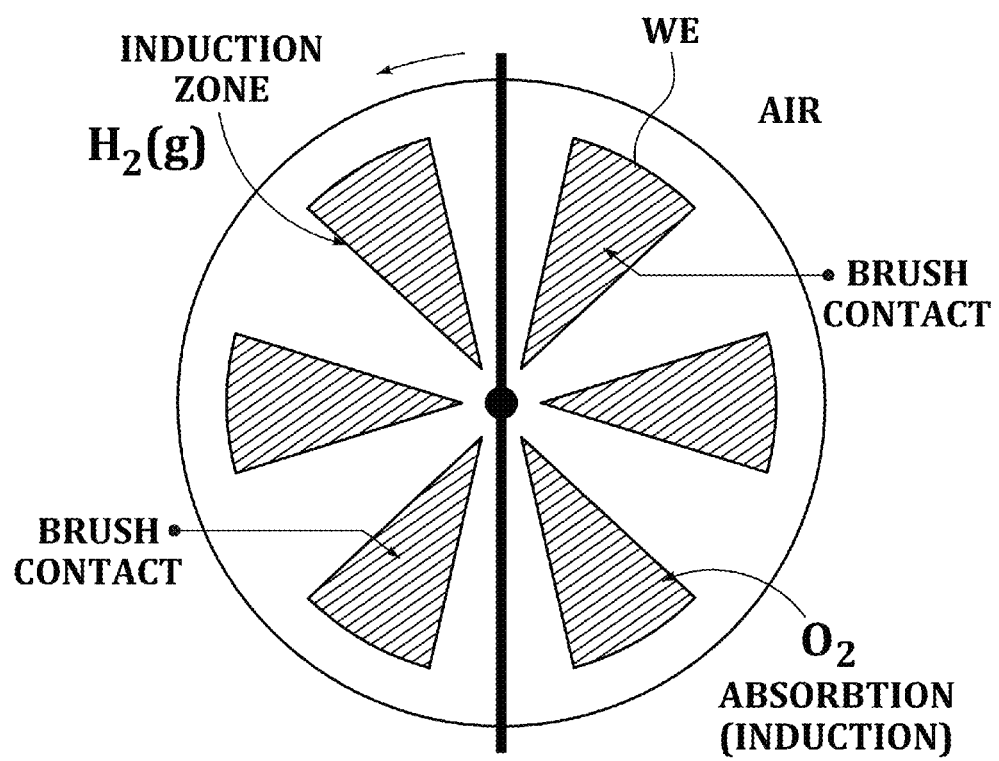
FIGS. 18A and 18B illustrate schemes for a rotating disk device whereby multiple working electrodes are used (FIG. 18A) and multiple gas chamber are used (FIG. 18B) to increase the frequency of the power generated by the devices.
Figure 18B:
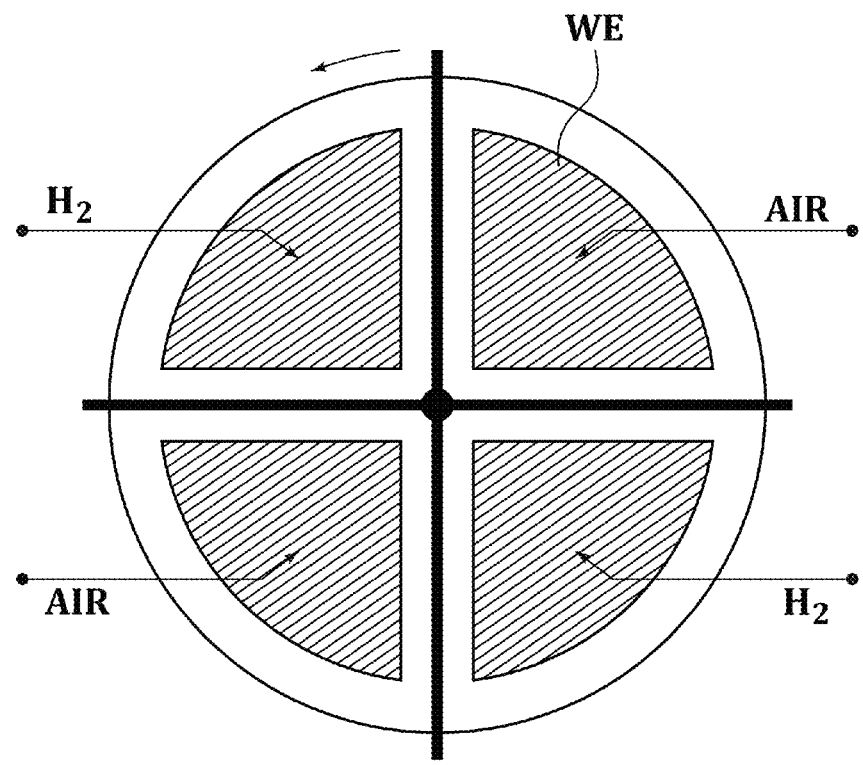

Referring to FIGS. 18A and 18B, scheme are illustrated for a rotating disk device whereby multiple working electrodes are used (FIG. 18A) and multiple gas chamber are used (FIG. 18B) to increase the frequency of the power generated by the devices. Referring to FIG. 18A, brush contacts are provided just prior to the interface between the fuel and oxidant chambers, so as to allow time between introduction of a working electrode into either of the fuel or oxidant, and discharge of that working electrode. By providing this time (an "induction" time), a period of time is allowed for fuel adsorption and disassociation between the ionization and discharge occurs.

In FIG. 18B, increased frequency power can be achieved at the same rotation speed of the disk by providing multiple fuel and oxidant chambers, and configuring the working electrodes accordingly. For example, the illustrated device in FIG. 13A would have double the power frequency compared to a device having a single fuel and oxidant chamber.

Figure 19A:
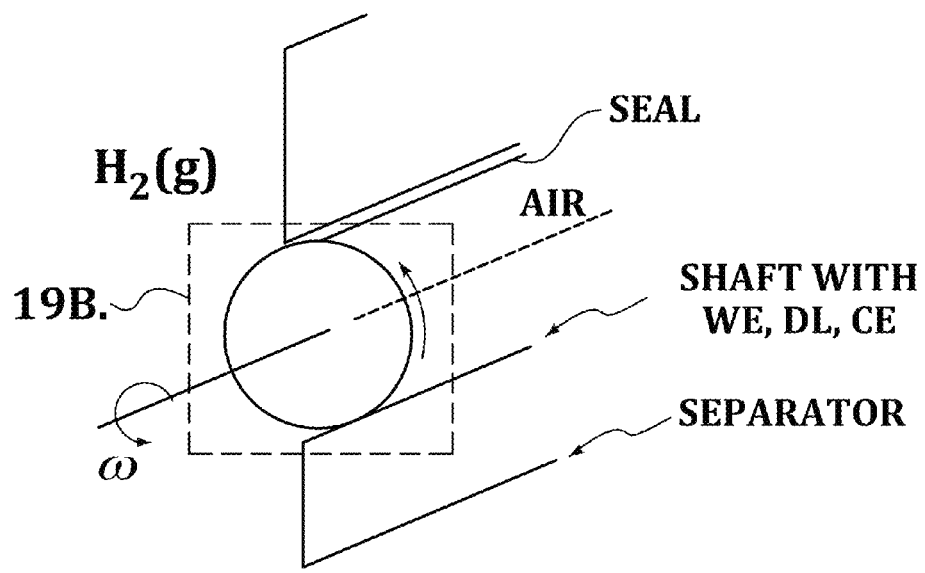
FIGS. 19A and 19B illustrate a cylindrical electrode design wherein capacitors are mounted on a cylinder spinning between a fuel region and an oxidant region.
Figure 19B:
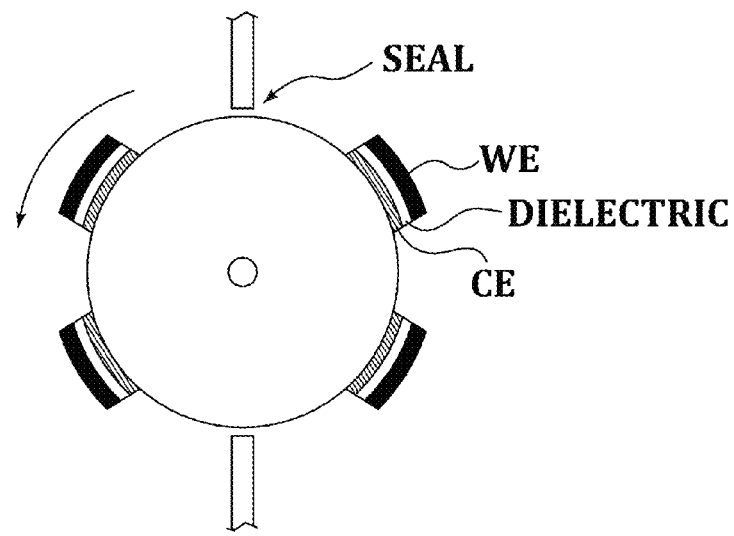

Referring to FIG. 19A, a cylindrical electrode design is provided wherein capacitors are mounted on a cylinder spinning between a fuel region and an oxidant region. In the exemplary embodiment of FIG. 19A, hydrogen and air (oxygen) are the fuel and oxidant, respectively. A plurality of capacitors are mounted on a cylinder, which is spun between the oxidant and fuel regions, which are sealed so as to keep separate. FIG. 19B provides a detail of the MIMs mounted on the cylinder.

Figures 20, 21:
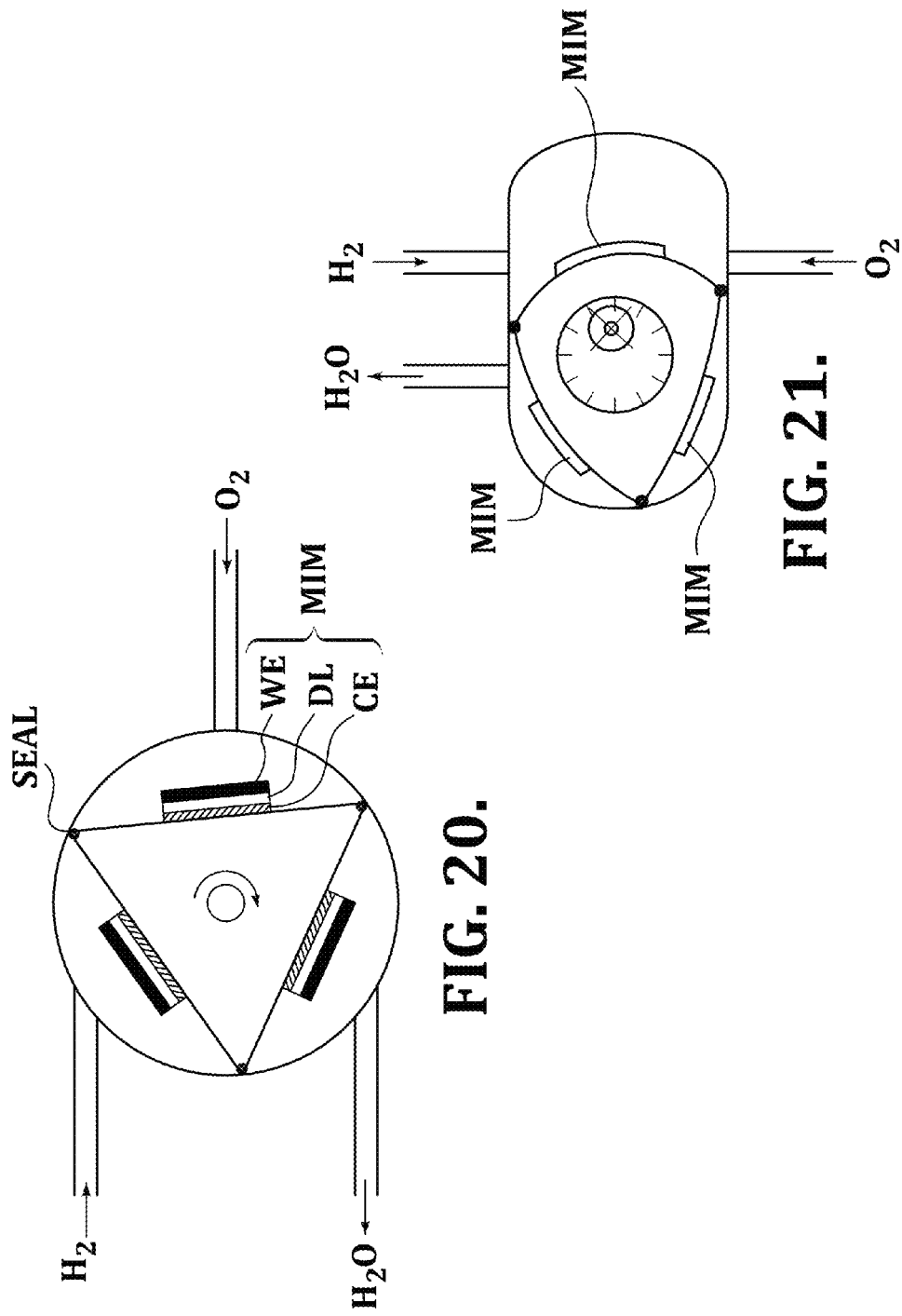
FIG. 20 a "triangular shaft" design is provided, whereby a triangular shaft has capacitors mounted on all three surfaces of the triangular shaft.
FIG. 21. A Wankel-type system is illustrated whereby a non-symmetric, three-surface shaft is used to control intake, compression, and exhaust in a rotating shaft system.

Referring to FIG. 20, a "triangular shaft" design is provided, whereby a triangular shaft has capacitors mounted on all three surfaces of the triangular shaft. The points of the triangle are sealingly fitted against the interior wall of a circular chamber that is configured to accept fuel and oxidant, and discharge exhaust as the capacitors turn through a full turn so as to produce electrical power in accordance with the methods described herein. The triangular shaft design of FIG. 20 is essentially a variation on the three-chamber rotating disk design illustrated in FIG. 14. However, it will be appreciated that certain scenarios may favor the potential for a long and narrow power generation system, such as the triangular shaft would offer, compared to a flat and wide system, as the disk system of FIG. 14A would provide.

In a variation of the triangular shaft design illustrated in FIG. 20, a "Wankel" shaft design can optionally be employed. Referring to FIG. 21, a Wankel shaft system is illustrated whereby a non-symmetric, three-surface shaft is used to control intake, compression, and exhaust in a rotating shaft system. Similar to a Wankel engine, by using an oblate rotor onto which capacitors are mounted, the compression characteristics of the gases introduced into the chamber can be controlled. Compression can be used to enhance the adsorption of the fuel and/or oxidant. Similarly, vacuum created by the system can be used to help discharge the reaction product (e.g., water).

As the above-described devices illustrate, there are an almost limitless number of ways which one could employ to rotate a capacitor through a fuel region and an oxidant region so as to generate electrical power in accordance with the methods provided herein. It will be appreciated that any such device is consistent with the scope of the invention, and the invention is not limited to the embodiments provided herein.

While illustrative embodiments have been illustrated and described, it will be appreciated that various changes can be made therein without departing from the spirit and scope of the invention.

The invention claimed is:

1. A method of generating electricity from a fuel and an oxidant, the method comprising the steps of:
   (a) immobilizing the fuel on a working electrode of the capacitor by:
   exposing the working electrode to the fuel, wherein the working electrode comprises a catalyst for an electrochemical reaction between the fuel and the oxidant; and
   charging the capacitor by biasing the working electrode such that it becomes positively charged and biasing a counter electrode of the capacitor such that it becomes negatively charged, wherein a dielectric of the capacitor separates the counter electrode from the working electrode, and wherein charging the capacitor is performed either before or after exposing the working electrode to the fuel;
   (b) exposing the working electrode to the oxidant after the fuel has been immobilized on the working electrode; and
   (c) generating electrical power by connecting an electrical load between the working electrode and the counter electrode.

2. The method of claim 1, wherein the step of charging the capacitor results from exposing the working electrode to the fuel without additional applied bias.

3. The method of claim 1, wherein the step of charging the capacitor comprises applying a voltage between the working electrode and the counter electrode.

4. The method of claim 3, wherein the step of charging the capacitor by applying a voltage is performed prior to the step of exposing the working electrode to the fuel.

5. The method of claim 3, further comprising a step of disconnecting the applied voltage between the working electrode and the counter electrode prior to the step of exposing the working electrode to the oxidant.

6. The method of claim 1, wherein exposing the working electrode to the fuel provides adsorbed fuel on the working electrode.

7. The method of claim 6, wherein charging the capacitor provides oxidized or partially oxidized fuel on the working electrode and stored electrons in the counter electrode.

8. The method of claim 7, wherein the step of generating electrical power by connecting an electrical load between the working electrode and the counter electrode generates electrical power by providing the stored electrons in the counter electrode to the adsorbed fuel on the working electrode, thereby allowing the adsorbed fuel on the working electrode to react with the oxidant to produce an oxidant-fuel product.

9. The method of claim 1, wherein the fuel is a neutral or ionic form of one or more of the following: hydrogen; CO; $N_2$; NO; $NO_2$; sulfur; $SO_2$; syngas; hydrogen sulfide; hydrogen peroxide; lower alkanes; all alkanes, including linear, branched, and cyclic species; all alkenes; all alkynes; all arenes; lower alkane alcohols; partially oxidized, hydroxylated, or sulfonated alkanes, alkenes, alkynes, and arenes; gasoline, kerosene, diesel, JP12, and crude oil; biofuels; ammonia, hydrazine, and methyl amine; boranes; acids; halogens; solvated metal cations; solvated metals and metal containing compounds; particulate metals and metal containing compounds; nanoparticles of any of the preceding; any chemical species that can be electrochemically oxidized; mixtures of any of the preceding; dilutions of the preceding with a solvent or gas; and humidified versions of any of the preceding.

10. The method of claim 1, wherein the oxidant is air or a neutral or ionic form of one or more of the following: oxygen, ozone, hydrogen peroxides, all peroxides, fluorine, chlorine, bromine, iodine, inorganic acids, organic acids, hypochlorite, chlorate, water, solvated metal cations, solvated metals and metal containing compounds, particulate metals and metal containing compounds, nanoparticles of any of the preceding, any chemical species that can be reduced, mixtures of any of the preceding, dilutions of the preceding with a solvent or gas, and humidified versions of any of the preceding.

11. The method of claim 1, wherein the working electrode catalyst is selected from the group consisting of Pt, Pd, all noble metals, Ni, Co, Cu, all transition metals, alloys of the preceding, oxides, supported catalysts, and combinations thereof.

12. The method of claim 1, wherein the counter electrode is selected from the group consisting of Al, Cu, Ni, Zn, steel, stainless steel, Pt, any metal, transparent conductors, conducting polymers, carbon materials, doped silicon, any doped or heavily doped semiconductor, nanowires or nanoparticles of the preceding, and combinations thereof.

13. A method of generating electricity from a fuel and an oxidant, the method comprising the steps of:
 (a) immobilizing the oxidant on a working electrode of the capacitor by:
  exposing the working electrode to the oxidant, wherein the working electrode comprises a catalyst for an electrochemical reaction between the fuel and the oxidant; and
  charging the capacitor by biasing the working electrode such that it becomes negatively charged and biasing a counter electrode of the capacitor such that it becomes positively charged, wherein a dielectric of the capacitor separates the counter electrode from the working electrode, and wherein charging the capacitor is performed either before or after exposing the working electrode to the fuel;
 (b) exposing the working electrode to the fuel after the oxidant has been immobilized on the working electrode; and
 (c) generating electrical power by connecting an electrical load between the working electrode and the counter electrode.

14. The method of claim 13, wherein the step of charging the capacitor results from exposing the working electrode to the oxidant without additional applied bias.

15. The method of claim 13, wherein the step of charging the capacitor comprises applying a voltage between the working electrode and the counter electrode.

16. The method of claim 15, wherein the step of charging the capacitor by applying a voltage is performed prior to the step of exposing the working electrode to the oxidant.

17. The method of claim 15, further comprising a step of disconnecting the applied voltage between the working electrode and the counter electrode prior to the step of exposing the working electrode to the fuel.

18. The method of claim 13, wherein exposing the working electrode to the oxidant provides adsorbed oxidant on the working electrode.

19. The method of claim 18, wherein charging the capacitor provides reduced or partially reduced oxidant on the working electrode and stored positive charge in the counter electrode.

20. The method of claim 19, wherein the step of generating electrical power by connecting an electrical load between the working electrode and the counter electrode generates electrical power by providing the stored positive charge in the counter electrode to the adsorbed oxidant on the working electrode, thereby allowing the adsorbed oxidant on the working electrode to react with the fuel to produce an oxidant-fuel product.

* * * * *